US005772072A

United States Patent [19]

Prescott et al.

[11] Patent Number: 5,772,072

[45] **Date of Patent: *Jun. 30, 1998**

[54] VENDING MACHINE INCLUDING REFRIGERATION AND OVEN COMPARTMENTS

[75] Inventors: Jack R. Prescott, Laguna Hills; John D. Smead, San Clemente; Edward Durbin, Point Richmond; Michael Kanyon, Sea Ranch; Michael E. Rudder, San Francisco; James W. Bradfield, Mill Valley; Gregory Elliott, Tustin; Stanley Arai, Aliso Viejo; Mark A. Hopkins, Laguna Niguel; Donald Morrison, Anaheim; Paul T. Rudewicz, Mission Viego; Kenneth Sineri, Placentia; Thom Thomas, Ventura; Dale Weber, Mission Viejo, all of Calif.

[73] Assignee: KRh Thermal Systems, San Bruno, Calif.

[ * ] Notice: The term of this patent shall not extend beyond the expiration date of Pat. No. 5,503,300.

[21] Appl. No.: 626,301

[22] Filed: Apr. 1, 1996

Related U.S. Application Data

[63] Continuation of Ser. No. 231,195, Apr. 21, 1994, Pat. No. 5,503,300.

[51] Int. Cl.[6] .............................. G07F 11/00; B65G 59/00

[52] U.S. Cl. .............................. 221/121; 53/459; 53/567; 221/150 HC; 221/150 A; 221/224; 221/211; 221/298

[58] Field of Search ...................... 53/567, 459; 221/119, 221/121, 122, 150 HC, 150 A, 224, 225, 113, 211, 298

[56] References Cited

U.S. PATENT DOCUMENTS

| | | | |
|---|---|---|---|
| 2,497,718 | 2/1950 | Early et al. | 221/11 X |
| 2,890,781 | 6/1959 | Gore | 194/10 |
| 3,589,409 | 6/1971 | Shaw | 53/459 |
| 3,653,541 | 4/1972 | Crum | 221/150 |
| 3,857,420 | 12/1974 | Newman | 221/224 X |
| 3,870,193 | 3/1975 | Schneider | 221/150 |
| 3,884,213 | 5/1975 | Smith | 126/21 A |

(List continued on next page.)

FOREIGN PATENT DOCUMENTS

| | | | |
|---|---|---|---|
| 0 092 368 | 4/1983 | European Pat. Off. . | |
| 0 339 806 | 11/1989 | European Pat. Off. . | |
| 2611465 | 9/1988 | France | 221/150 A |
| 2 667 421 | 4/1992 | France . | |
| 2 675 931 | 10/1992 | France . | |
| 1 236 996 | 3/1967 | Germany . | |
| 0053500 | 4/1977 | Japan | 221/150 A |
| 906376 | 9/1960 | United Kingdom . | |
| 2 209 331 | 5/1989 | United Kingdom . | |
| WO 89/12417 | 12/1989 | WIPO . | |
| WO 94/28700 | 12/1994 | WIPO . | |

OTHER PUBLICATIONS

Weber, entitled "New Drive Provides Smooth Indexing Motion", Machine Design, Jul. 9, 1993, pp. 46–50.

*Primary Examiner*—H. Grant Skaggs
*Attorney, Agent, or Firm*—Skjerven, Morrill, MacPherson, Franklin & Friel LLP; David E. Steuber

[57] ABSTRACT

A vending machine includes a refrigeration compartment, an oven compartment, structure for transferring a food product from the refrigeration compartment to the oven compartment, and structure for transferring the food product from the oven compartment to a user of the vending machine. The vending machine provides automated handling and cooking of packaged food products that enables a hot cooked food to be delivered to a customer in a cool package sleeve. The vending machine also includes a system for inventory control that enables vertical storage of packaged food products while minimizing crushing of packaged food products at the bottom of a stack. A magazine empty indicator automatically indicates when an inventory magazine is empty. An oven door latch mechanism eliminates the possibility that the oven can be operated while the oven door is open.

23 Claims, 37 Drawing Sheets

U.S. PATENT DOCUMENTS

| | | | |
|---|---|---|---|
| 3,951,303 | 4/1976 | Hobden et al. | 221/96 |
| 4,057,171 | 11/1977 | Hatori et al. | 227/6 |
| 4,109,825 | 8/1978 | Weitzman | 221/14 |
| 4,289,254 | 9/1981 | Spring | 221/298 |
| 4,338,911 | 7/1982 | Smith | 126/21 A |
| 4,409,453 | 10/1983 | Smith | 219/10.55 A |
| 4,429,778 | 2/1984 | Levasseur | 194/10 |
| 4,438,683 | 3/1984 | Bartfield | 99/330 |
| 4,456,148 | 6/1984 | Newman et al. | 221/132 |
| 4,480,764 | 11/1984 | Takagi et al. | 221/11 |
| 4,492,839 | 1/1985 | Smith | 219/10.55 R |
| 4,632,274 | 12/1986 | Garbe | 221/132 X |
| 4,679,542 | 7/1987 | Smith et al. | 126/21 A |
| 4,722,267 | 2/1988 | Galockin et al. | 99/357 |
| 4,748,902 | 6/1988 | Maurantonio | 99/326 |
| 4,784,292 | 11/1988 | Johndrow et al. | 221/150 HC |
| 4,809,881 | 3/1989 | Becker | 221/224 |
| 4,816,635 | 3/1989 | Edamura | 219/10.55 |
| 4,838,445 | 6/1989 | Lanius | 220/22.3 |
| 4,978,032 | 12/1990 | Newman et al. | 221/113 |
| 4,991,739 | 2/1991 | Levasseur | 221/14 |
| 5,077,462 | 12/1991 | Newell | 235/381 |
| 5,097,754 | 3/1992 | Covington et al. | 99/357 |
| 5,127,544 | 7/1992 | Robinson et al. | 221/150 R X |
| 5,131,841 | 7/1992 | Smith et al. | 432/59 |
| 5,134,927 | 8/1992 | McCarthy, III et al. | 99/427 |
| 5,147,994 | 9/1992 | Smith et al. | 219/10.55 R |
| 5,158,857 | 10/1992 | Shinozaki et al. | 430/262 |
| 5,203,253 | 4/1993 | Covington et al. | 99/357 |
| 5,205,255 | 4/1993 | Yamagata et al. | 123/331 |
| 5,207,351 | 5/1993 | Lesar | 221/224 X |
| 5,210,387 | 5/1993 | Smith et al. | 219/10.55 M |
| 5,219,092 | 6/1993 | Morand | 221/191 X |
| 5,245,150 | 9/1993 | Grandi | 219/10.55 |
| 5,310,978 | 5/1994 | Smith | 219/681 |
| 5,400,699 | 3/1995 | Cailbault | 99/357 |
| 5,503,300 | 4/1996 | Prescott et al. | 221/273 |

KEY TO FIG 10F

| | |
|---|---|
| FIG. 10F-1 | FIG. 10F-2 |

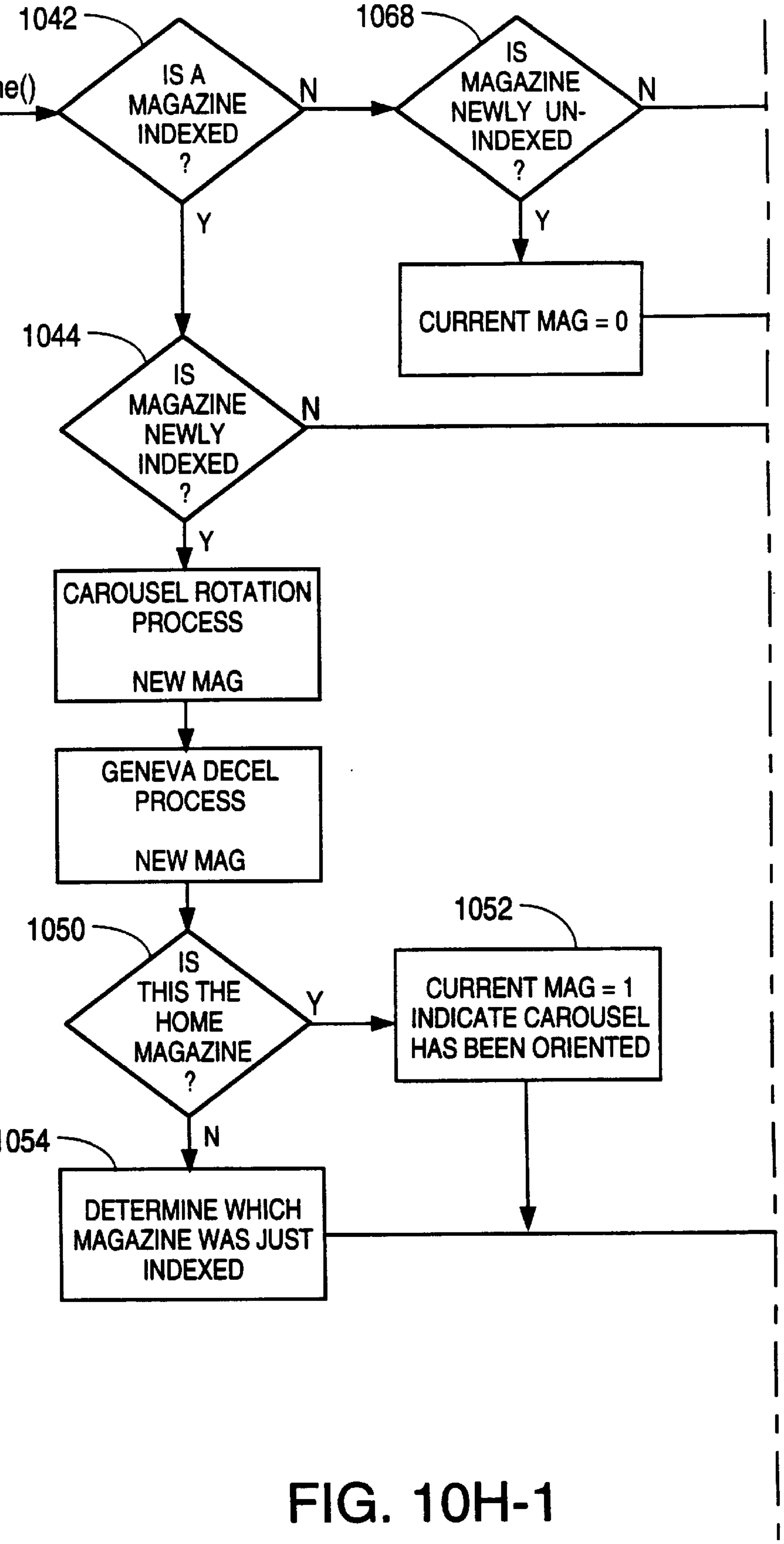
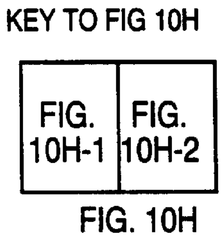
FIG. 10H
FIG. 10H-1

VENDING MACHINE INCLUDING REFRIGERATION AND OVEN COMPARTMENTS

This application is a continuation of application Ser. No. 08/231,195, filed Apr. 21, 1994 and now U.S. Pat. No. 5,503,300.

CROSS-REFERENCE TO MICROFICHE APPENDIX

Appendix A, which is a part of the present disclosure, is a microfiche appendix consisting of 3 sheets of microfiche having a total of 285 frames. Microfiche Appendix A is a listing of computer programs and related data in one embodiment of this invention, which is described more completely below.

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of the Invention

This invention relates to a vending machine and, in particular to a vending machine including a refrigeration compartment, an oven compartment, structure for transferring a food product from the refrigeration compartment to the oven compartment, and structure for transferring the food product from the oven compartment to a user of the vending machine.

2. Related Art

Vending machines for storing and distributing food and other items to customers upon payment of a specified sum of money are known. In some vending machines, hot food can be dispensed to customers. Such vending machines typically include a refrigerator for storing food, an oven for cooking food, a mechanism for transferring food between the refrigerator and oven, and a mechanism for dispensing the food from the vending machine. One previous vending machine is described in U.S. Pat. No. 5,210,387 to Smith et al., entitled "Food Handling System." Such vending machines have experienced problems, however, particularly in the storage area where the packages which contain the food items are typically stacked so high that packages at the bottom of the stack become crushed.

SUMMARY OF THE INVENTION

A vending machine according to the invention includes a refrigeration compartment, an oven, structure for transferring a food product from the refrigeration compartment to the oven, and structure for transferring the food product from the oven to a user of the vending machine.

In the refrigeration compartment, the food containing packages are stored in a vertical column arrangement, with each column being subdivided by retention levers into separate stacks to prevent the packages at the bottom of the column from having to bear the weight of all of the overlying packages.

The refrigeration compartment includes an inventory carousel which holds a plurality of inventory magazines, each inventory magazine holding several stacks of food packages. When a consumer makes a selection from the vending machine, the inventory carousel rotates until an inventory magazine which holds the selected food item is positioned over a food delivery door in a floor of the refrigeration compartment. The retention levers in that inventory magazine are then actuated, and the bottom food package in each stack is released. For all stacks except the lowermost stack, the food package drops to the next lower stack. The bottom food package in the lowermost stack is released so that it may be delivered from the bottom of the refrigeration compartment. In a preferred embodiment, the food package is dropped on to the food delivery door, which then opens to release the food package from the refrigeration compartment.

The rotational movement of the inventory carousel is produced by means of a Geneva mechanism and controlled by a software program, both of which are structured to limit the acceleration forces on the inventory carousel and associated mechanical parts and thereby reduce mechanical wear.

The food package includes a tray which holds the food item and a package sleeve which encloses the tray. The ends of the package sleeve are beveled to aid the retention levers in holding the food package and to prevent the food packages from binding while they are in the inventory magazine.

The food package is received by a delivery tray after the food package leaves the refrigeration compartment. In a preferred embodiment, after receipt of the food package, the delivery tray pivots 90 degrees so as to align the food package properly with a sleeve/de-sleeve mechanism. The sleeve/de-sleeve mechanism removes the tray from the package sleeve and inserts the tray into the oven, where the food item is cooked for a preselected time.

At the conclusion of the cooking cycle, the sleeve/de-sleeve mechanism replaces the hot food tray into the package sleeve, and the food package is delivered to the consumer.

The vending machine of this invention contains many unique features which improve operation of the vending machine. For example, the delivery tray is tilted upon receipt of the food package from the refrigeration compartment to prevent the food package from getting caught in the food delivery door of the refrigeration compartment. The oven includes an interlock switch which prevents the oven (advantageously a microwave oven) from being turned on while the oven door is opened.

DETAILED DESCRIPTION OF EMBODIMENTS OF THE INVENTION

Figure 1:
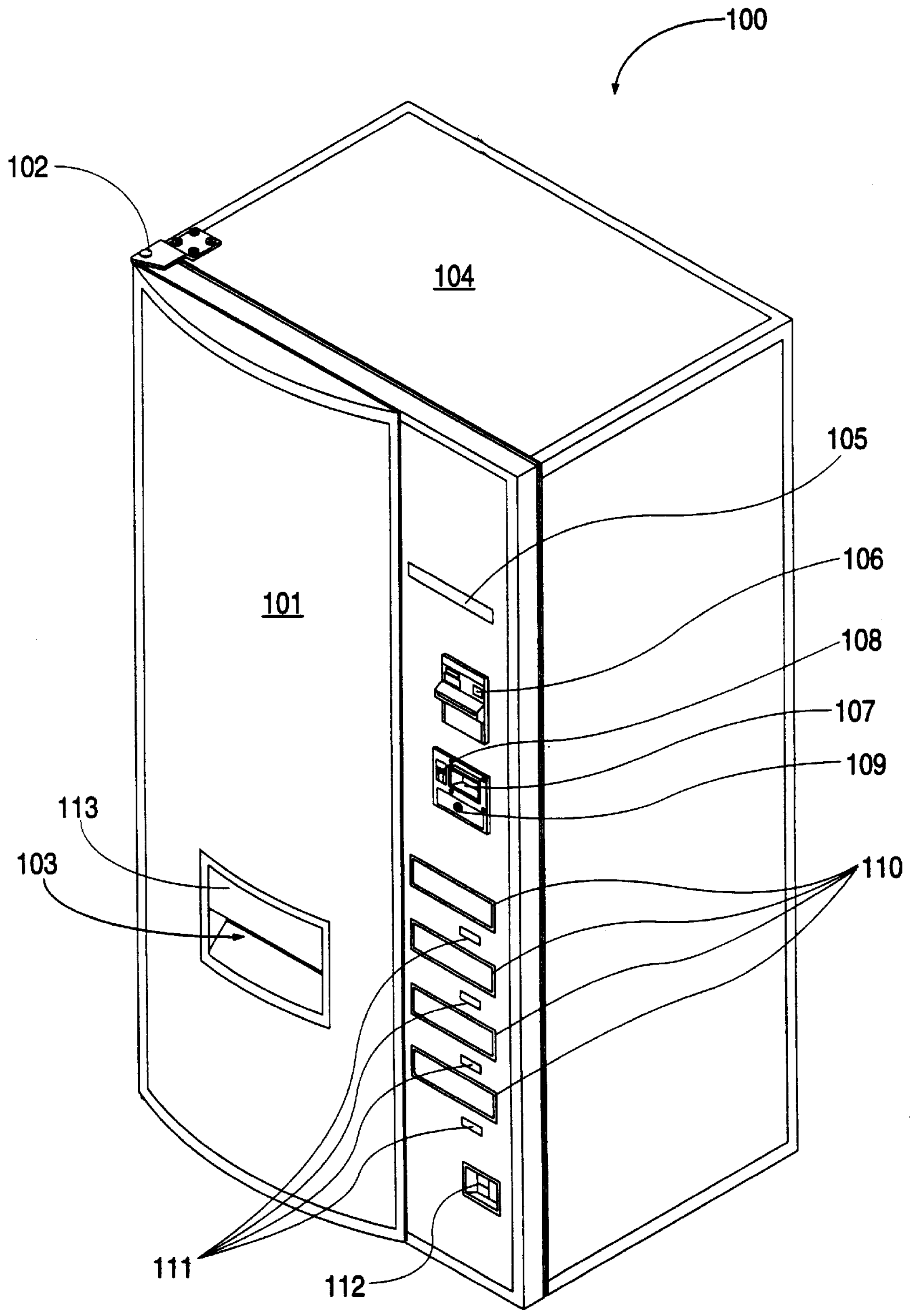
FIG. 1 is a perspective view of a vending machine according to the invention.
Figure 2:
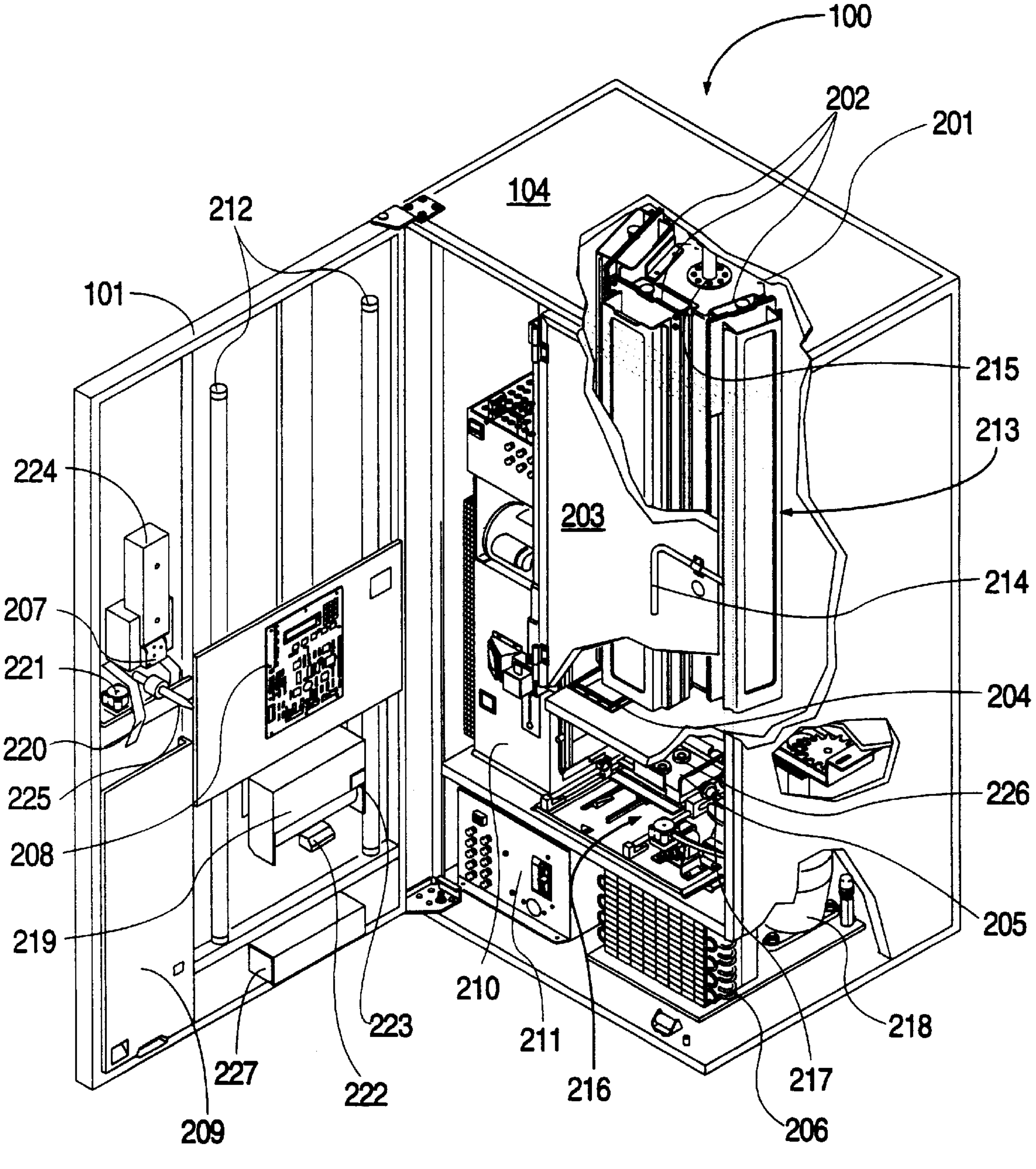
FIG. 2 is a perspective view of the vending machine of FIG. 1 with the front service door in an open position, illustrating components within the interior of the vending machine.

FIG. 1 is a perspective view of a vending machine 100 according to the invention. Vending machine 100 includes a main cabinet 104 and a front service door 101. In FIG. 1, front service door 101 is in a closed position, forming an enclosure with main cabinet 104, within which various components of vending machine 100 are housed, as explained in more detail below. Front service door 101 rotates about a hinge 102 so that front service door 101 can be positioned in an open position, as illustrated in FIG. 2.

Front service door 101 includes a convex-shaped section adjacent a flat section; however, this shape is not necessary to the invention. The convex-shaped section is lighted from behind, as explained further below, and typically includes a graphic display identifying the vending machine.

A delivery chute 103 is formed in the convex-shaped section of front service door 101 so that food products can be discharged from vending machine 100. A tamper barrier 113 helps to prevent tampering with the interior of vending machine 100 through delivery chute 103.

Various user interface features are formed in the flat section of front service door 101. A customer display 105 is a conventional fluorescent display panel for displaying various items of information to a user of vending machine 100. A bill acceptor slot 106 accepts paper money into a conventional bill acceptor mechanism 207 (FIG. 2) for purchasing food products or for making change. A coin insertion slot 107 accepts coins into a conventional coin changer for purchasing food products or for making change. A coin return actuator 108 is a conventional push-button mechanism for activating a coin return mechanism that returns the appropriate coins to a coin return slot 112. Coin return slot 112 also returns change either from purchasing a food product or from making change for paper money or larger coins. A door lock 109 enables front service door 101 to be secured so that front service door 101 cannot be opened without a key. A group of price displays 110 illustrate to the user the prices for each of the food products available from vending machine 100. A group of food selection buttons 111, each food selection button 111 corresponding to one of price displays 110, are conventional push-button mechanisms for enabling a user to select a desired food product from vending machine 100.

FIG. 2 is a perspective view of vending machine 100 with front service door 101 in an open position, illustrating components within the interior of vending machine 100. Some portions of vending machine 100 are cut away to better illustrate components of vending machine 100.

Various components are mounted on the interior of front service door 101. Two light sources 212 (other numbers of light sources can be used) emit light that is visible through front service door 101 so that the display on front service door 101 is backlit. In one embodiment, light sources 212 are fluorescent light bulbs. Bill acceptor mechanism 207 causes paper money inserted into bill acceptor slot 106 (FIG. 1) to be drawn into vending machine 100. A coin changer (only top 221 is visible in FIG. 2) supplies coins to coin return slot 112 and is located behind panel 209. A coin guide 220 guides inserted coins into the coin changer. A bill validator 224 ascertains proper insertion of paper money into bill acceptor slot 106. Locking latch 225 extends through refrigerator compartment door 203 and secures front service door 101. The ballast for the fluorescent bulbs is located behind cover 227. Swinging door 219, which is generally locked, is unlocked by solenoid 223 to allow discharge of a packaged food product through delivery chute 103. Stop 222 is used to help discharge a packaged food product from delivery tray 205, as explained in more detail below.

A control board 208 is a printed circuit board on which circuitry is formed and to which integrated circuit chips are attached. Control board 208 includes a microprocessor which is electrically connected to various sensors, motors, and other devices within vending machine 100 to control the functions of vending machine 100. Herein, when reference is made to performance of specified functions by control board 208, it is understood that the functions are controlled by the microprocessor and associated circuitry formed on control board 208.

A power supply 211 is mounted within main cabinet 104 underneath an oven 210 and supplies power for the electronics of vending machine 100. Power supply 211 supplies power at 24 volts DC, 5 volts DC, 24 volts AC rectified and unfiltered, 115 volts AC and 208 volts AC.

The interior of vending machine 100 includes, among other components discussed below, oven 210, a refrigeration compartment 213 (which is, in a preferred embodiment, a freezer), a delivery tray 205, a transfer mechanism 216 for movement (both rotational and translational) of delivery tray 205, and a sleeve/de-sleeve mechanism 217 for movement of a packaged food product to and from oven 210. Packaged food products are stored in refrigeration compartment 213, as described in more detail below. When a user selects a desired food product, the appropriate packaged food product is transferred from refrigeration compartment 213 through a food delivery door 204 to delivery tray 205, as also described in more detail below. Delivery tray 205 is positioned appropriately adjacent oven 210, the packaged food product is transferred into oven 210 by sleeve/de-sleeve mechanism 217, and the food product is cooked, each of these processes and associated structure being described more fully below. The packaged food product is then transferred from oven 210 back on to delivery tray 205 by sleeve/de-sleeve mechanism 217. Transfer mechanism 216 causes delivery tray 205 to move adjacent delivery chute 103, whereupon the packaged food product is discharged from vending machine 100.

Figure 3:
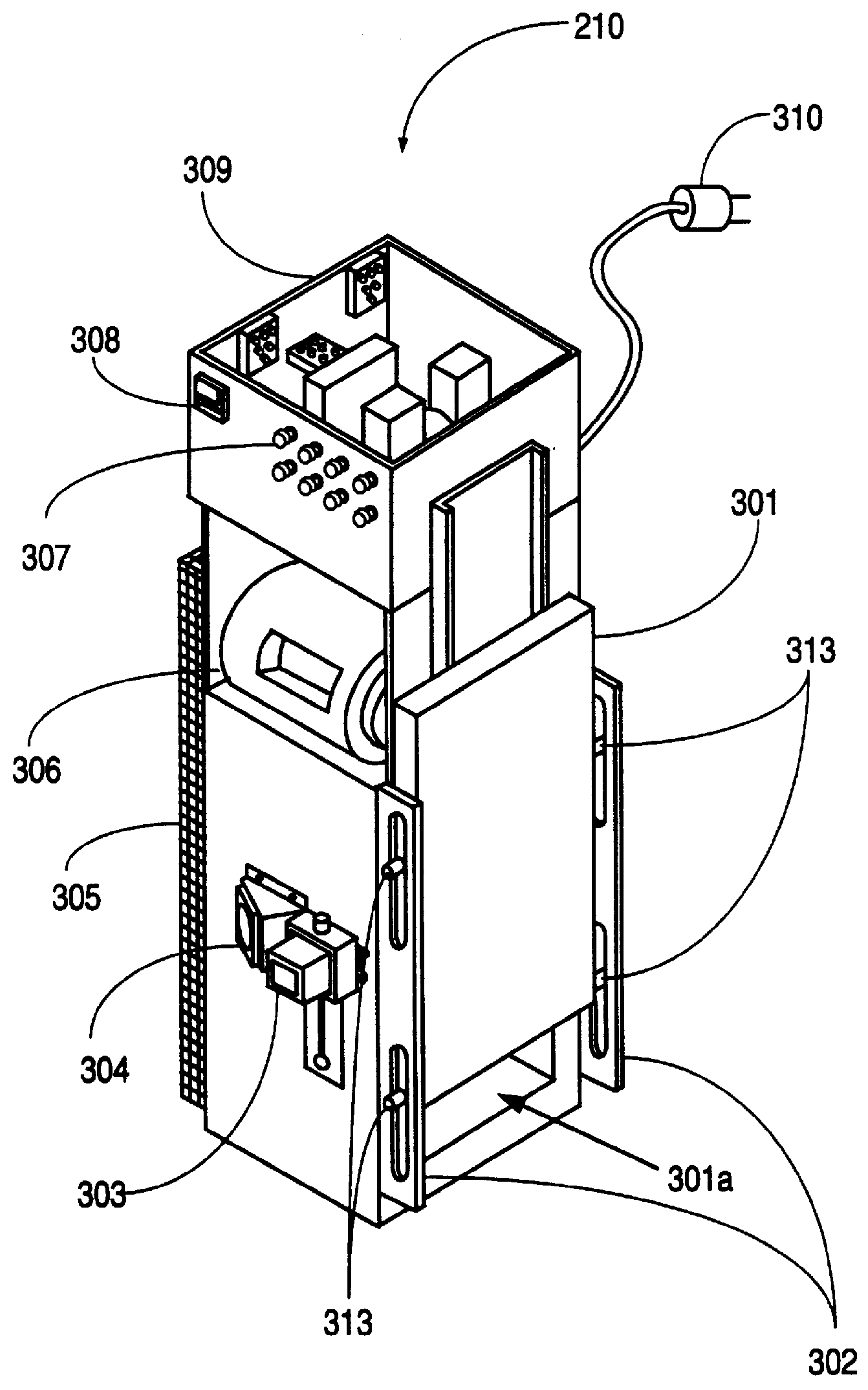
FIG. 3 is a simplified perspective view of the oven of the vending machine of FIG. 1.

FIG. 3 is a simplified perspective view of oven 210. The operation and construction of oven 210 is described in more detail in U.S. Pat. No. 5,147,994 to Smith et al., issued Sep. 15, 1992, the pertinent disclosure of which is incorporated by reference herein. Some parts of oven 210, e.g., the interlock switch and associated actuating mechanism (see FIG. 13B), have been eliminated from FIG. 3 for clarity.

An oven door 301 is raised or lowered to expose or cover an oven aperture 301*a*. As explained in more detail below, an oven door motor, which is mounted beneath oven power supply box 309, drives an oven door bracket to move oven door 301. Oven door 301 is raised to an open position, as shown in FIG. 3, to allow a packaged food product to be inserted into and removed from oven 210 through oven aperture 301*a*. Oven door 301 is lowered to a closed position when a packaged food product is being cooked in oven 210. Pairs of guide pins 313 formed on opposite sides of oven door 301 move in corresponding slots in oven door guide rails 302 to guide the motion of oven door 301.

An oven power supply box 309 houses the power supply and control electronics for oven 210. Oven power supply box 309 is plugged into an outlet formed within main cabinet 104 by an oven power supply plug 310. An oven temperature sensor 308 is attached to oven power supply box 309 and monitors the temperature within oven 210. A plurality of safety fuses 307 are also formed on oven power supply box 309. Impingement motor 306 runs impingement blower within oven 210.

During operation of oven 210, a magnetron 303 supplies the microwaves within oven 210 with another magnetron (not visible in FIG. 3) located on the opposite side of oven 210. Associated with each magnetron is a magnetron fan 304 that cools the magnetron during operation of oven 210. A screen 305 is made of metal and contains microwaves within oven 210.

Referring again to FIG. 2, refrigeration compartment 213 is cooled by a refrigeration unit that includes a set of refrigeration coils 206 and a compressor 218 that is commercially available from Tecumseh Products Company of Tecumseh, Mich., as Model No. #AE2415-A. The refrigeration unit is mounted within vending machine 100 beneath refrigeration compartment 213. Refrigeration compartment 213 is accessed by opening a refrigeration compartment door 203. Refrigeration compartment door 203 is held closed by a latch 214. Latch 214 has an extending portion (not visible in FIG. 2) which fits into a corresponding slot formed along one edge of main cabinet 104 when latch 214 is in the position shown in FIG. 2.

Refrigeration compartment 213 houses an inventory carousel 201 which is attached to refrigeration compartment 213 as described below with respect to FIG. 6A. A multiplicity of inventory magazines 202 (three of which are shown in FIG. 2) are mounted, as described below with respect to FIG. 6A on inventory carousel 201. Each inventory magazine 202 has the capacity to hold a multiplicity of packaged food products. In the embodiment shown in FIG. 1, 30 packaged food products are housed in each inventory magazine 202. Each packaged food product includes a food product in a tray that is, in turn, contained within a package sleeve that has an opening at each of two opposing ends. The tray and package sleeve are described in more detail below with respect to FIGS. 9A and 9B.

Generally, any number of inventory magazines 202 can be mounted on inventory carousel 201 given the space constraints of refrigeration compartment 213. In the embodiment of the invention shown in FIG. 1, five inventory magazines 202 are mounted on inventory carousel 201. In this embodiment, vending machine 100 includes four food selection buttons ill. Each of three inventory magazines 202 holds packaged food products of one of the four types of food products available from vending machine 100. The fourth and fifth inventory magazines 202 hold packaged food products of the fourth type of food product available from vending machine 100, which is typically the product having the highest sales volume.

Figure 4:
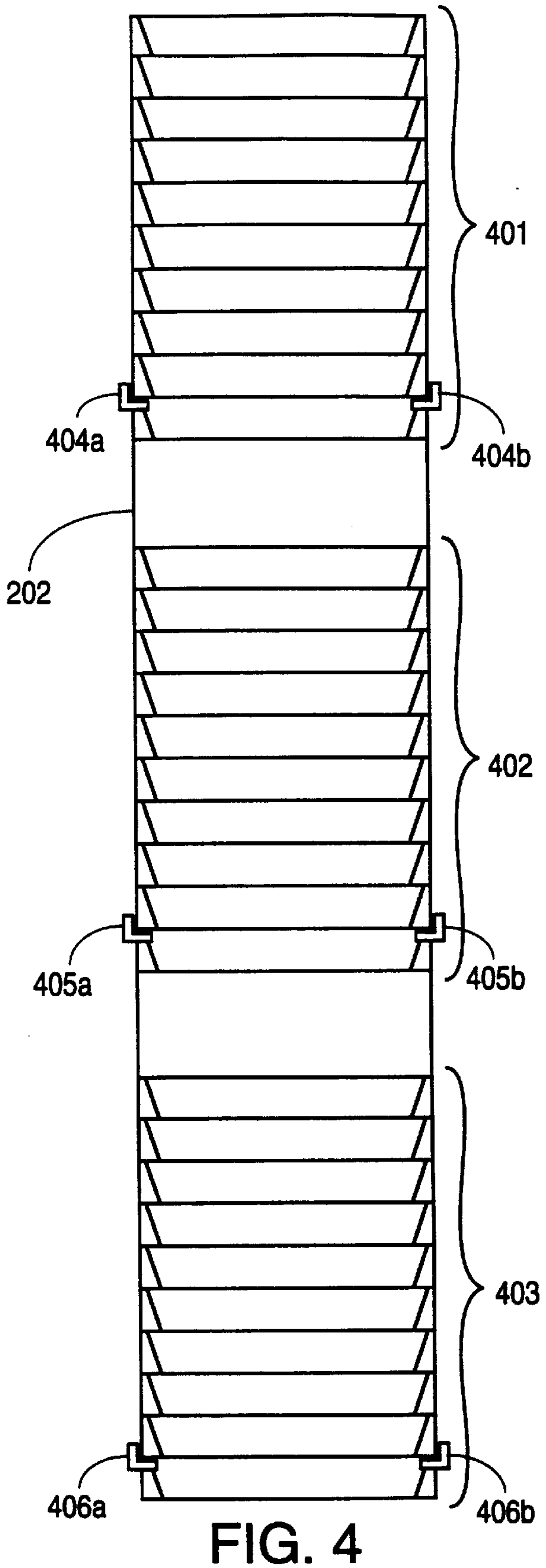
FIG. 4 is a simplified cross-sectional view of an inventory magazine according to the invention illustrating division of packaged food products in the inventory magazine into separate groups.

As explained in more detail below, the packaged food products in each inventory magazine 202 are divided into a multiplicity of separate stacks of food products, the stacks arranged vertically within each inventory magazine 202. In the embodiment of the invention shown in FIG. 1, in which each inventory magazine 202 contains 30 packaged food products, each inventory magazine 202 contains three stacks 401, 402 and 403 of 10 packaged food products, as shown schematically in FIG. 4. Each stack 401, 402 and 403 is held in place by a pair of retention levers 404*a* and 404*b*, 405*a* and 405*b*, and 406*a* and 406*b*, respectively. Subdividing the 30 packaged food products in this way prevents the bottom packaged food products in a stack from being crushed by the overlying packaged food products, since only 10 packaged food products are in any one stack, rather than 30.

Figure 5A:
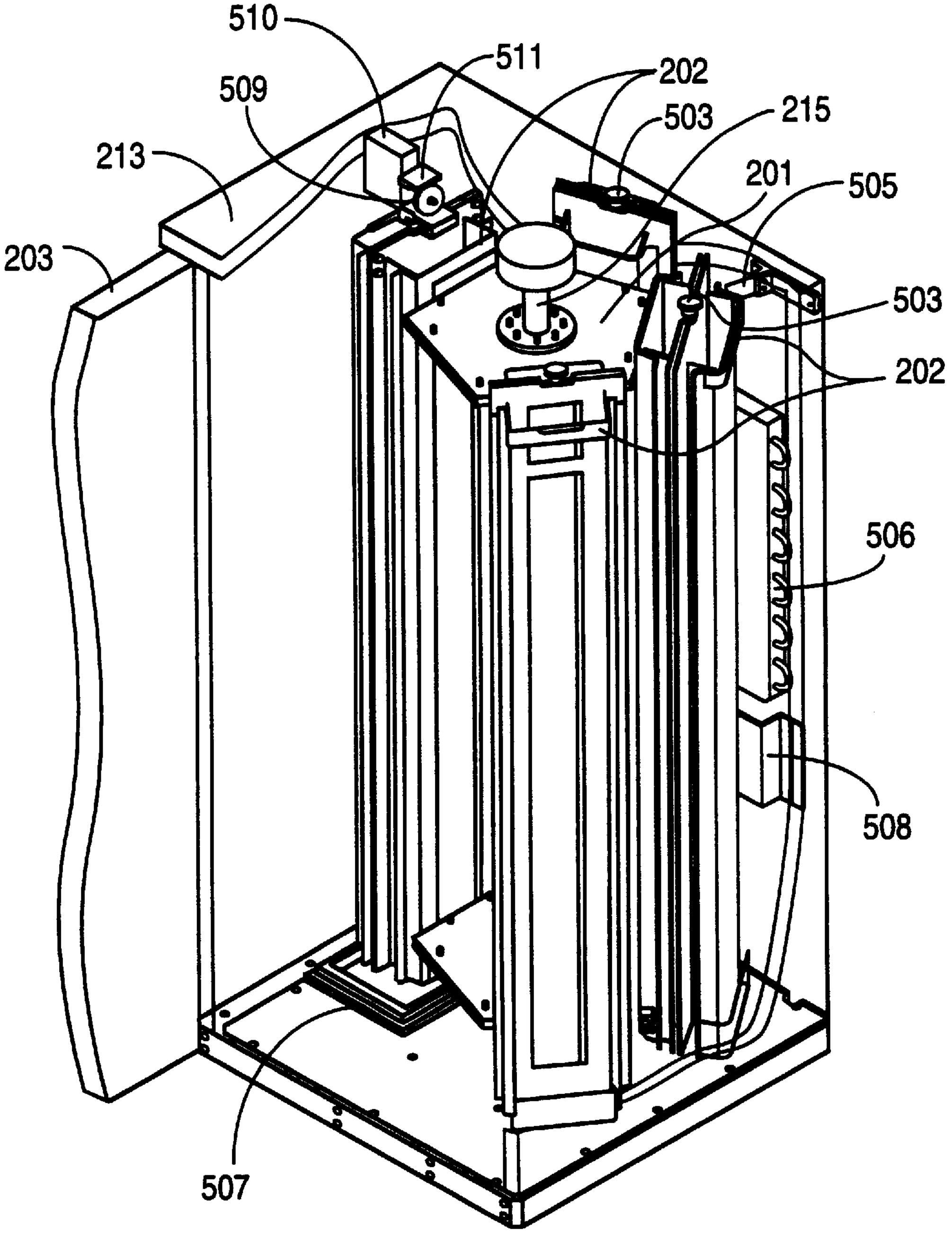
FIG. 5A is a perspective cutaway view of the refrigeration compartment of the vending machine of FIG. 1.

FIG. 5A is a perspective cutaway view of refrigeration compartment 213. A set of refrigeration coils 506 supply cooling fluid to cool refrigeration compartment 213. Refrigeration coils 506 are periodically heated to prevent ice from forming on the exterior of refrigeration coils 506. A moisture collector 508 collects water that drips from refrigeration coils 506 and routes the water through tubing (not shown) to the bottom of vending machine 100 where the water can be left to evaporate or discharged from vending machine 100.

Figure 7A:
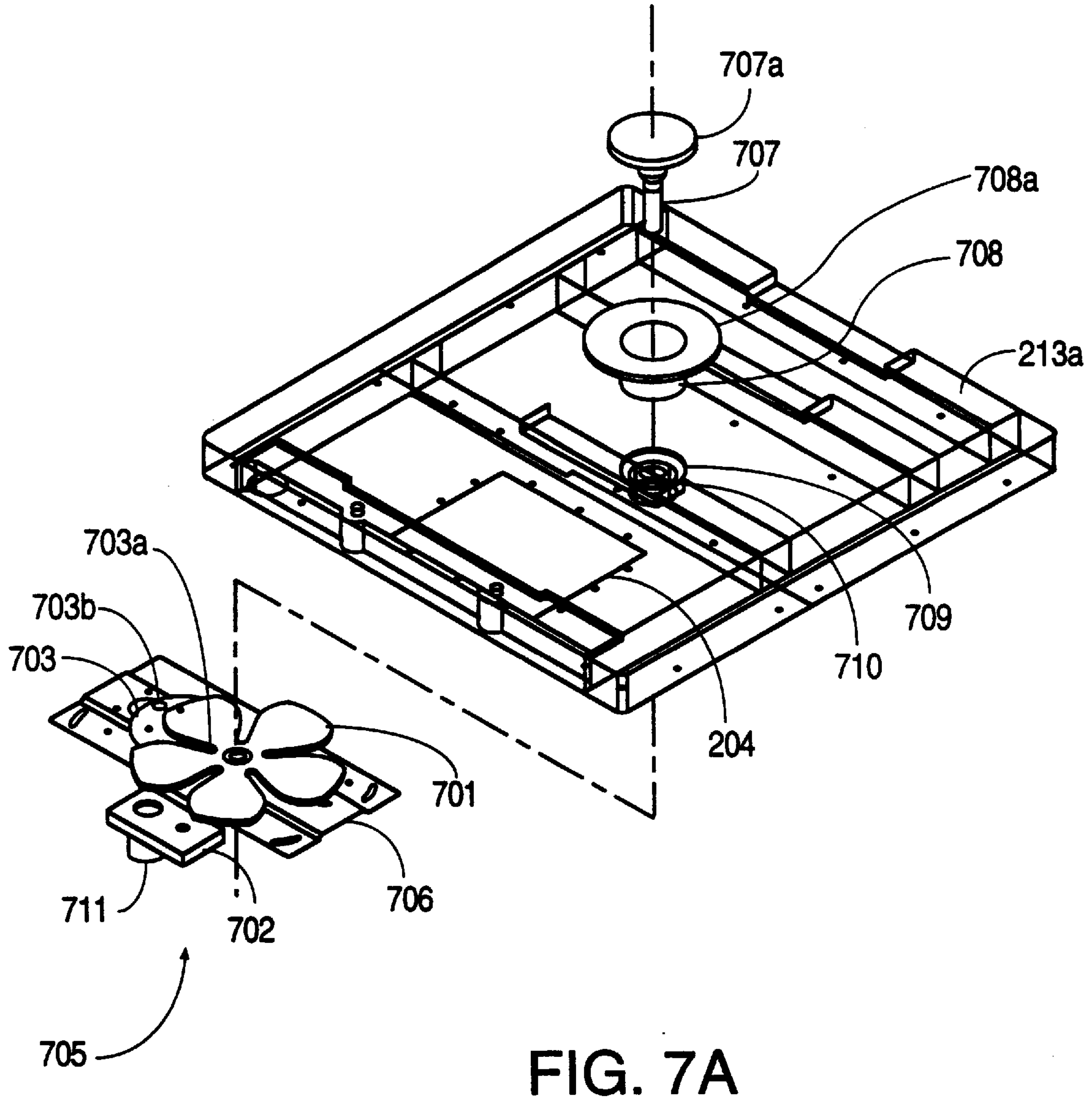
FIG. 7A is an exploded perspective view of the floor of the refrigeration compartment of FIG. 5A and a modified Geneva mechanism used to control rotation of the inventory carousel of the vending machine of FIG. 1.

Referring to FIG. 7A, inventory carousel 201 is attached to a shaft 707 which is driven by an inventory carousel motor 711 to rotate inventory carousel 201 so as to position a desired inventory magazine 202 above food delivery door 204. Referring again to FIG. 5A, a damper 505, which is a piece of sheet metal, fastened by, for instance, screws, to an interior wall of refrigeration compartment 213, helps control the rotational motion of inventory carousel 201 by applying a force to one of inventory magazines 202 opposite to the direction of rotation of inventory carousel 201.

A hole is formed in floor 213*a* of refrigeration compartment 213. A frame 507 is bolted to floor 213*a* of refrigeration compartment 213 around the hole to define an opening through which packaged food products are transferred from refrigeration compartment 213 to delivery tray 205. Unless a packaged food product is being transferred from refrigeration compartment 213, food delivery door 204 is closed and covers the opening in floor 213*a*. Food delivery door 204 is in an open position in FIG. 5A and therefore is not visible in FIG. 5A.

Figure 5C:
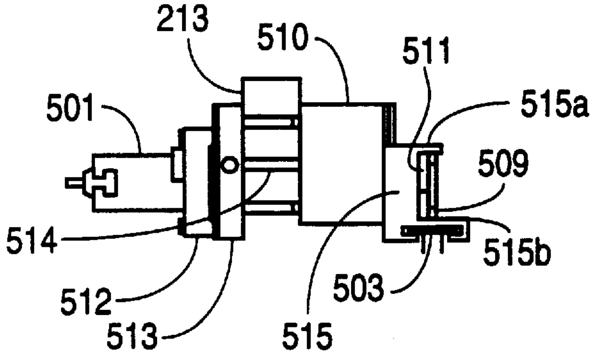
FIG. 5C is a front view of a portion of an inventory magazine of the vending machine of FIG. 1.
Figure 5B:
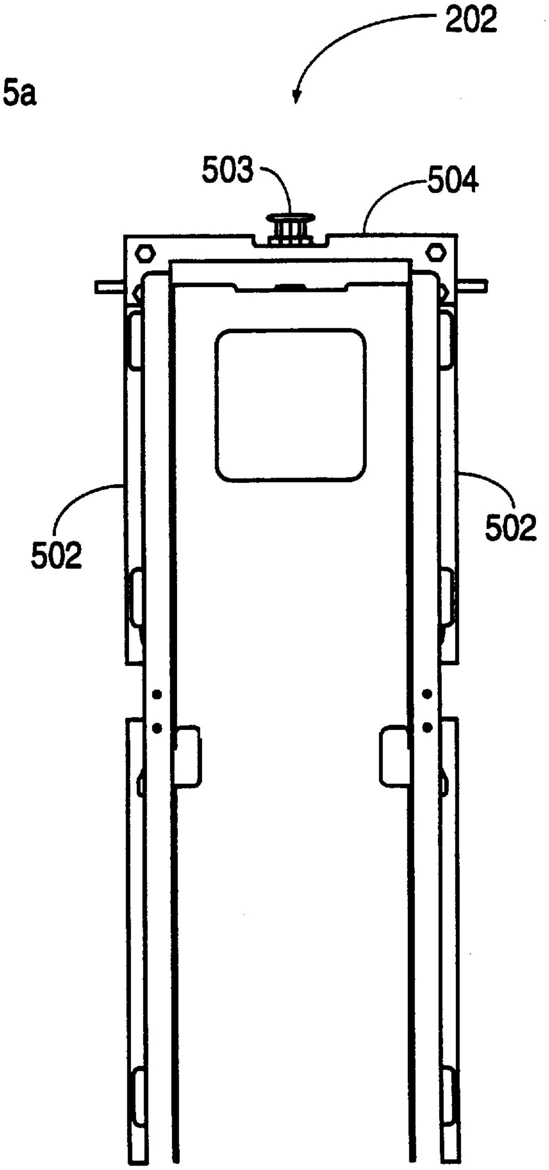
FIG. 5B is a side view of a portion of an inventory carousel of the vending machine of FIG. 1.

FIG. 5B is a side view of a portion of inventory carousel 201 illustrating a mechanism, explained in more detail below, for releasing packaged food products from one stack, e.g., stack 401, 402 or 403 (FIG. 4), to the top of another stack or out of inventory magazine 202 and through food delivery door 204 to delivery tray 205. Parts of inventory carousel 201 have been eliminated from FIG. 5B to improve the clarity of the drawing. FIG. 5C is a front view of a portion of inventory magazine 202.

To use vending machine 100, a user selects a food product by pressing one of food selection buttons 111 (FIG. 1). Each of food selection buttons selects a food product, e.g., french fries or pizza, as shown by the corresponding one of price displays 110. The depressed food selection button 111 closes a switch to notify control board 208 that a particular food product has been chosen. Control board 208 tests whether a food product is in delivery chute 103 by monitoring a conventional electrical switch mounted on the floor of delivery chute 103. If a food product is in delivery chute 103, operation of vending machine 100 is suspended until the food product is removed.

If a food product is not in delivery chute 103, then control board 208 activates the inventory carousel motor 711 (FIG. 7A) which rotates inventory carousel 201 until the appropriate inventory magazine 202 is positioned above food delivery door 204. A mechanism for indexing inventory carousel 201, described in more detail below, notifies control board 208 when the proper inventory magazine 202 is above food delivery door 204, at which time control board 208 ceases activation of the inventory carousel motor 711 and causes a braking force to be applied to inventory carousel 201.

Figure 6A:
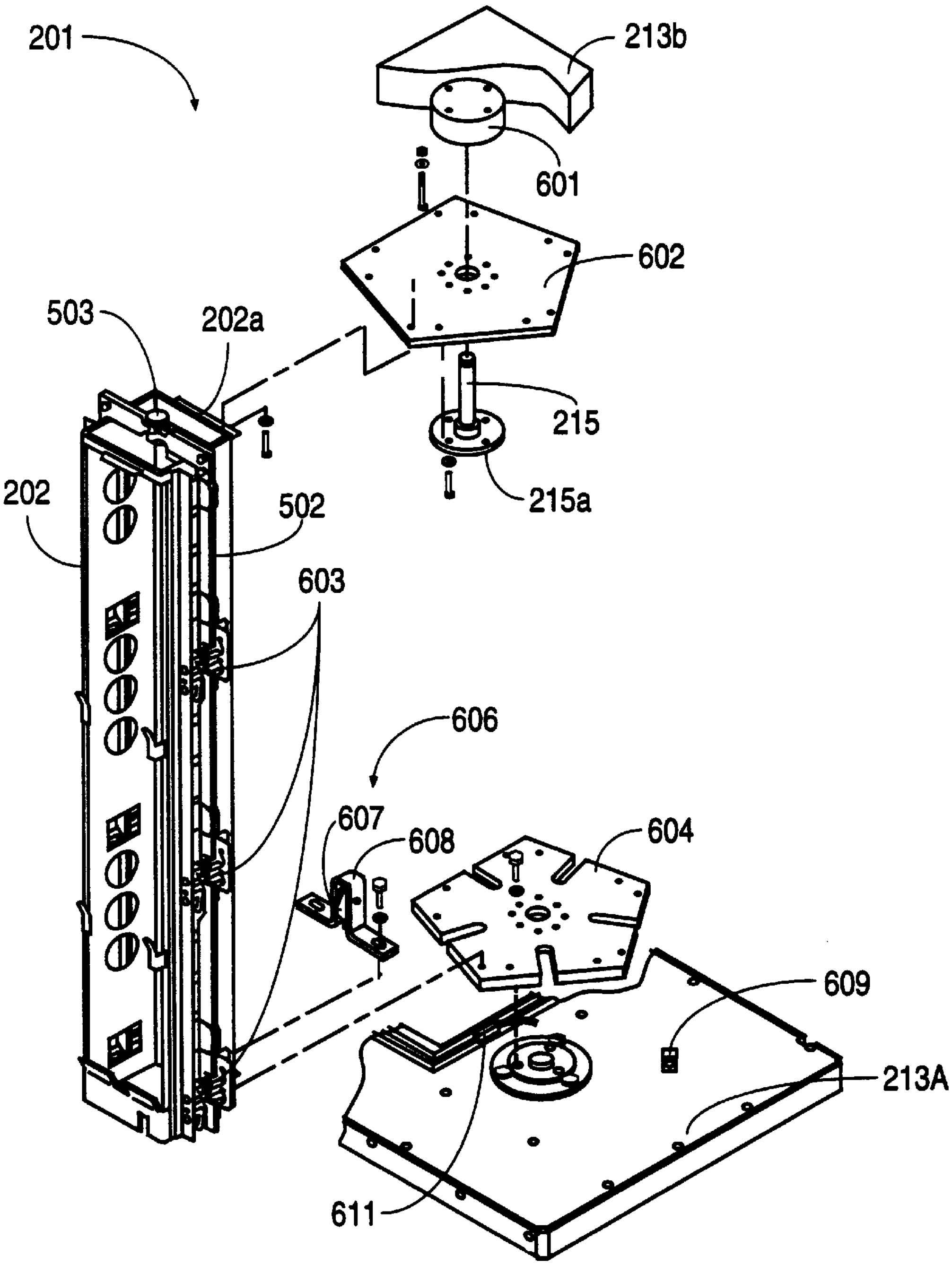
FIG. 6A is an exploded perspective view of the inventory carousel and one of the inventory magazines of the vending machine of FIG. 1.

FIG. 6A is an exploded perspective view of inventory carousel 201 with one of inventory magazines 202. A shaft bearing 601 is attached to ceiling 213*b* of refrigeration compartment 213 with, for instance, nuts and bolts. Shaft 215 extends through a hole in a top carousel plate 602 and into shaft bearing 601. Flange 215*a* is formed at the end of shaft 215 opposite the end within shaft bearing 601. Flange 215*a* is attached to top carousel plate 602 with, for instance, nuts and bolts.

Each of inventory magazines 202 includes a flange 202*a* near the top of inventory magazine 202 which is attached to top carousel plate 602 with, for instance, nuts and bolts. A flange (not visible in FIG. 6A) is also formed at the bottom of inventory magazine 202 and is attached to a bottom carousel plate 604 with, for instance, nuts and bolts. Bottom carousel plate 604 is, in turn, rotatably attached as described with respect to FIGS. 7A and 7B below, to the bottom of refrigeration compartment 213.

An empty magazine indicator 606 is attached to inventory magazine 202 near the bottom of inventory magazine 202 and indicates, as described in more detail below, when inventory magazine 202 no longer contains any packaged food products. One empty magazine indicator 606 is attached to each inventory magazine 202. A wire clamp 609 guides wires from the sensor of empty magazine indicator 606 along floor 213*a* of refrigeration compartment 213.

Figure 6B:
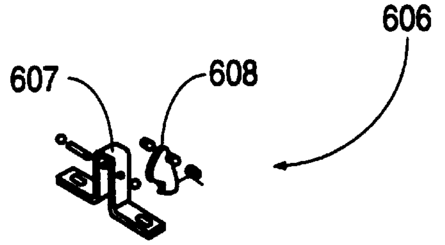
FIG. 6B is an exploded perspective view of an empty magazine sensor used with the inventory magazine of FIG. 6A.
Figure 6C:
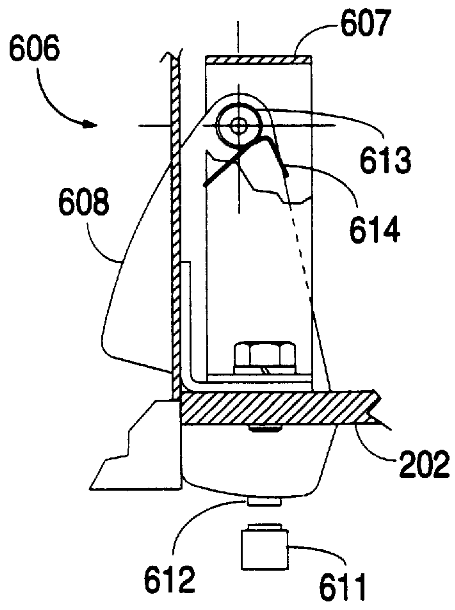
FIG. 6C is a side view of the empty magazine sensor of FIG. 6B in a first position when the inventory magazine is empty.
Figure 6D:
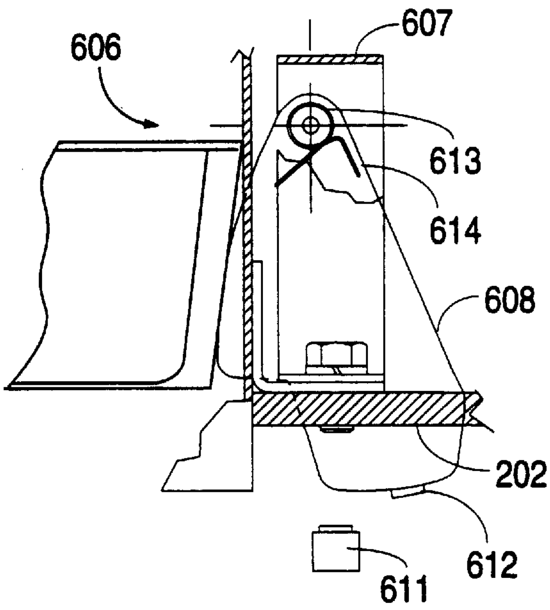
FIG. 6D is a side view of the empty magazine sensor of FIG. 6B in a second position when the inventory magazine is not empty.
Figure 6E:
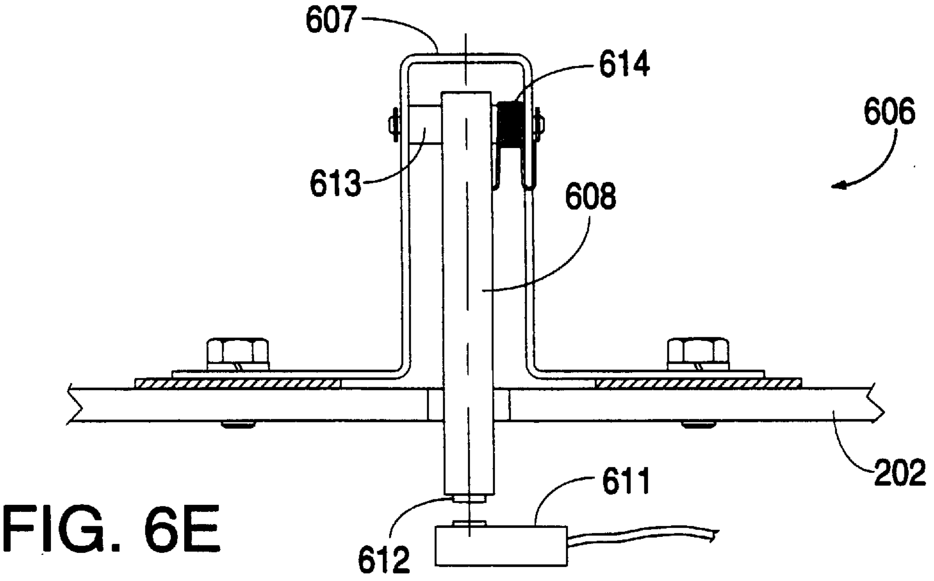
FIG. 6E is an end view of the empty magazine sensor of FIG. 6B.

FIG. 6B is an exploded perspective view of one of empty magazine sensors 606. FIG. 6C is a cutaway side view of empty magazine indicator 606 in a first position when inventory magazine 202 is empty. FIG. 6D is a cutaway side view of empty magazine indicator 606 in a second position when inventory magazine 202 is not empty. FIG. 6E is an end view of empty magazine indicator 606. Each of empty magazine sensors 606 includes a bracket 607 and a cam 608. Bracket 607 is attached to inventory magazine 202 by, for instance, nuts and bolts. Cam 608 includes a hole through which a rod 613 (FIGS. 6C and 6D) extends, rod 613 spanning the slot formed by bracket 607, so that cam 608 rotates about rod 613. Cam 608 is biased by a spring 614 to rotate forward to the position shown in FIG. 6C. A magnet 612 is mounted on the bottom of cam 608 and a Hall effect sensor 611 is mounted on floor 213*a* of refrigerator compartment 213. Hall effect sensor 611 and magnet 612 operate, as described in more detail below, to determine whether any packaged food products remain in inventory magazine 202.

FIG. 7A is an exploded perspective view of floor 213*a* of refrigeration compartment 213 and a modified Geneva mechanism 705 used to control rotation of inventory carousel 201. Modified Geneva mechanism 705 includes a cloverleaf-shaped output turret 701 and an input disk 703 on which drive pins 703*a* and 703*b* are formed. Turret 701 and input disk 703 are each rotatably attached to a mounting plate 706. An inventory carousel motor 711 is mounted on motor mounting plate 702, which is, in turn, attached to mounting plate 706, and drives input disk 703 to rotate, thereby causing inventory carousel 201 to rotate as explained below.

Figure 7B:
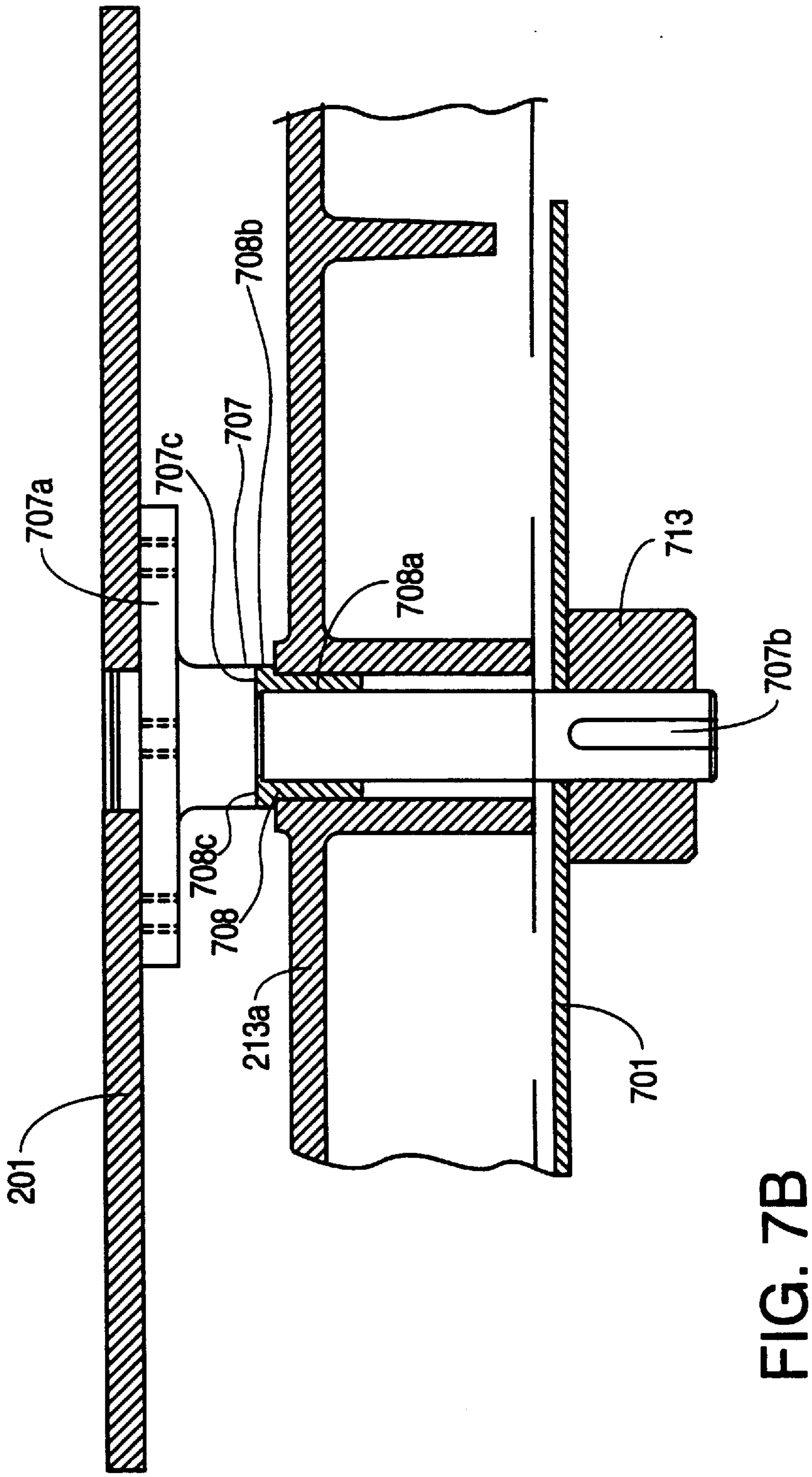
FIG. 7B is a cross-sectional view of a portion of the floor and modified Geneva mechanism of FIG. 7A.

FIG. 7B is a cross-sectional view of a portion of floor 213*a* of refrigeration compartment 213 and turret 701 of modified Geneva mechanism 705. Inventory carousel 201 is attached with nuts and bolts to a flange 707*a* of shaft 707. A shelf 707*c* of shaft 707 contacts a surface 708*c* of a Teflon bushing 708 so that shaft 707 fits through a hole 708*a* of bushing 708. A shelf 708*b* of bushing 708 is mounted on raised ribs of floor 213*a* so that, with shaft 707, bushing 708 extends through a hole in floor 213*a*. Shaft 707 includes key slot 707*b* in which a mating key (not shown) of hub 713 fits so that hub 713 is fixedly attached to shaft 707. Turret 701 is welded to hub 713. Consequently, when input disk 703 (FIG. 7A) is rotated to drive turret 701, shaft 707 is rotated, thereby rotating inventory carousel 201.

Figure 7E:
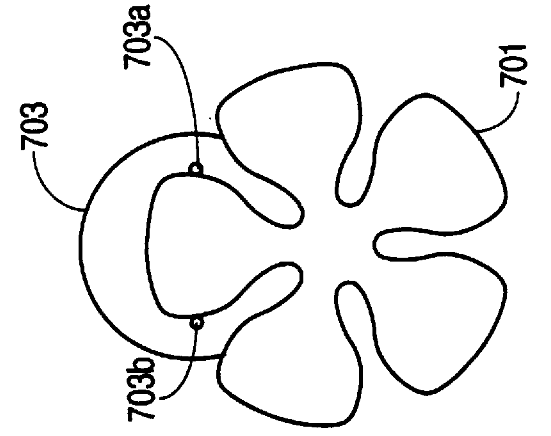
FIG. 7E is a simplified plan view of the modified Geneva mechanism of FIG. 7A illustrating the second indexed position.
Figure 7D:
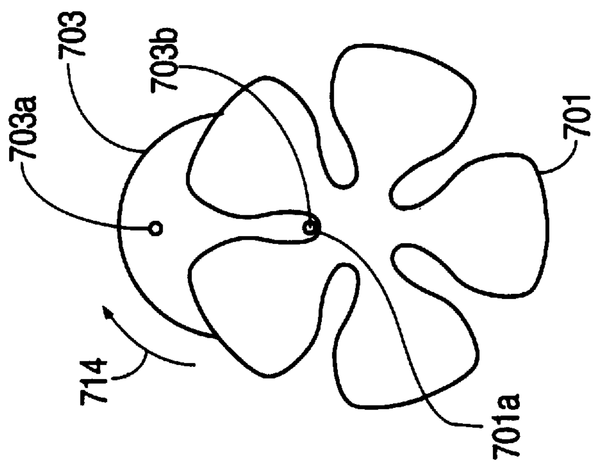
FIG. 7D is a simplified plan view of the modified Geneva mechanism of FIG. 7A illustrating a position midway between the first indexed position and a second indexed position.
Figure 7C:
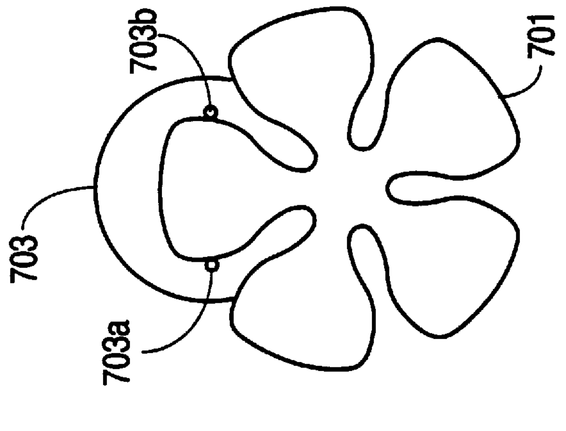
FIG. 7C is a simplified plan view of the modified Geneva mechanism of FIG. 7A illustrating a first indexed position.

FIGS. 7C through 7E are simplified plan views of modified Geneva mechanism 705 illustrating, respectively, a first index position, a position midway between the first index position and a second index position, and a second index position through which modified Geneva mechanism 705 passes during rotation of inventory carousel 201. "Index position" refers to a position of inventory carousel 201 where one of inventory magazines 202 is positioned over food delivery door 204. To rotate inventory carousel 201, inventory carousel motor 711 drives input disk 703 to rotate. At the beginning of rotation, inventory carousel 201 is positioned at a first index position (FIG. 7C). Rotation of input disk 703 in the direction of arrow 714 causes drive pin 703*b* to enter slot 701*a* of turret 701. As drive pin 703*b* enters slot 701*a*, drive pin 703*b* contacts turret 701, causing turret 701 to rotate. This, in turn, causes inventory carousel 201 to rotate (through shaft 707 and bottom carousel plate 604). Drive pins 703*a* and 703*b* are successively rotated into slots in turret 701 to continue advancing inventory carousel 202 to successive index positions, as directed by control board 208.

Although, in the embodiment of FIGS. 7A through 7E, a modified Geneva mechanism is used to drive rotation of the inventory carousel, it is to be understood that other drive mechanisms can be used such as a conventional Geneva mechanism or a barrel cam indexer. Other types of drive mechanisms that can be used with the invention are described in more detail at pp. 47–49 of the Jul. 9, 1993 issue of Machine Design, the pertinent disclosure of which is incorporated by reference herein.

Returning to FIG. 5B, after inventory carousel 201 reaches a desired position, control board 208 activates a magazine actuator motor 501 to drive the mechanism for releasing packaged food products from the stacks within one of inventory magazines 202. An inventory magazine lift mount 510 is attached to a wall of refrigeration compartment 213 by screws that are threaded through a mounting plate 513 located outside refrigeration compartment 213, through the wall of refrigeration compartment 213 and into inventory magazine lift mount 510. An inventory magazine lift 515 is movably attached to inventory magazine lift mount 510 and includes protruding arms 515*a* and 515*b*. A roller 509 and a crank 511 are mounted on a side of inventory magazine lift 515 opposite the side mounted to inventory magazine lift mount 510.

A magazine actuator motor 501 is attached to a mounting plate 512 which is, in turn, attached to mounting plate 513. Magazine actuator motor 501 rotates shaft 514, which, in turn, rotates a shaft (not shown) extending from inventory magazine lift 511. Roller 509 is eccentrically mounted via crank 511 to the shaft extending from inventory magazine lift 515 so that when the shaft is rotated, roller 509 contacts protruding arms 515*a* and 515*b* to cause inventory magazine lift 515 to move up and down.

A slot is formed in protruding arm 515*b* of inventory magazine lift 515. A lift engagement head 503 is attached to a cross bar 504 which links inventory magazine release rods 502. The lift engagement head 503 of the currently indexed inventory magazine 202 fits within the slot of protruding arm 515*b*, so that when inventory magazine lift 511 moves up and down, the inventory magazine release rods 502 are moved up and down. As seen in FIG. 6A, each inventory magazine release rod 502 includes a multiplicity of cam mechanisms 603, one cam mechanism 603 being associated with each stack of packaged food products in each inventory magazine 202. Cam mechanisms 603 control movement of the packaged food products through inventory magazine 202 in response to the up and down movement of inventory magazine release rod 502, as described in more detail below. One inventory magazine release rod 502, and associated cam mechanisms 603, is located on each side of inventory magazine 202.

Figure 8A:
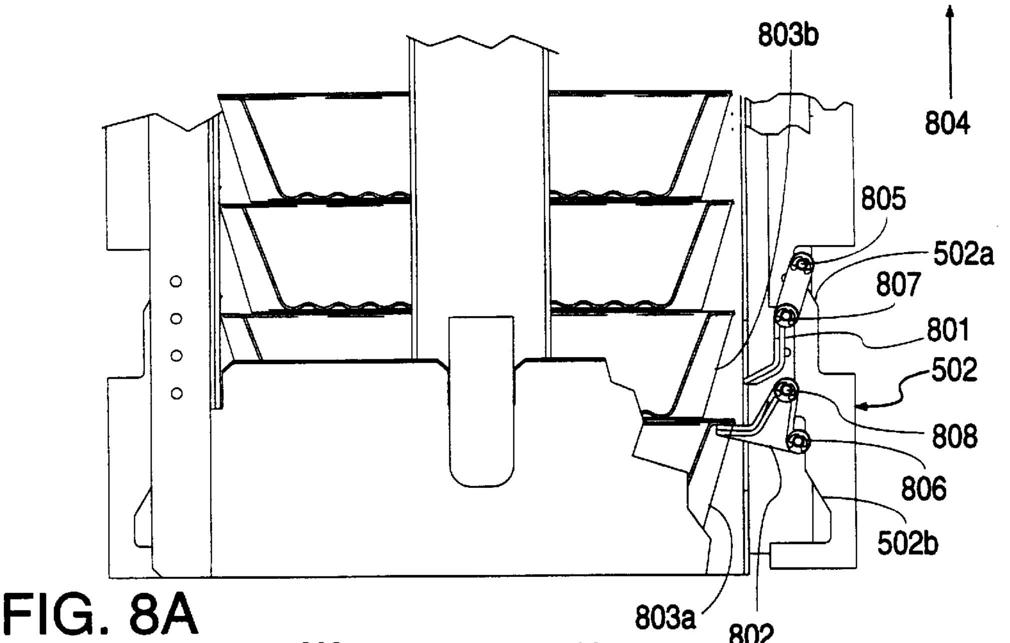
FIG. 8A is a cross-sectional view of a portion of the inventory magazine of FIG. 6A illustrating a first position of a cam mechanism for controlling the discharge of packaged food products from the inventory magazine.
Figure 8B:
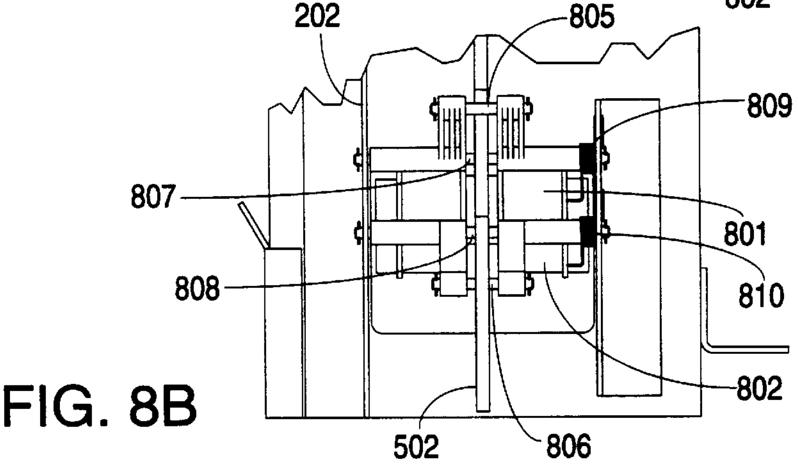
FIG. 8B is an end view of the cam mechanism of FIG. 8A.
Figure 8C:
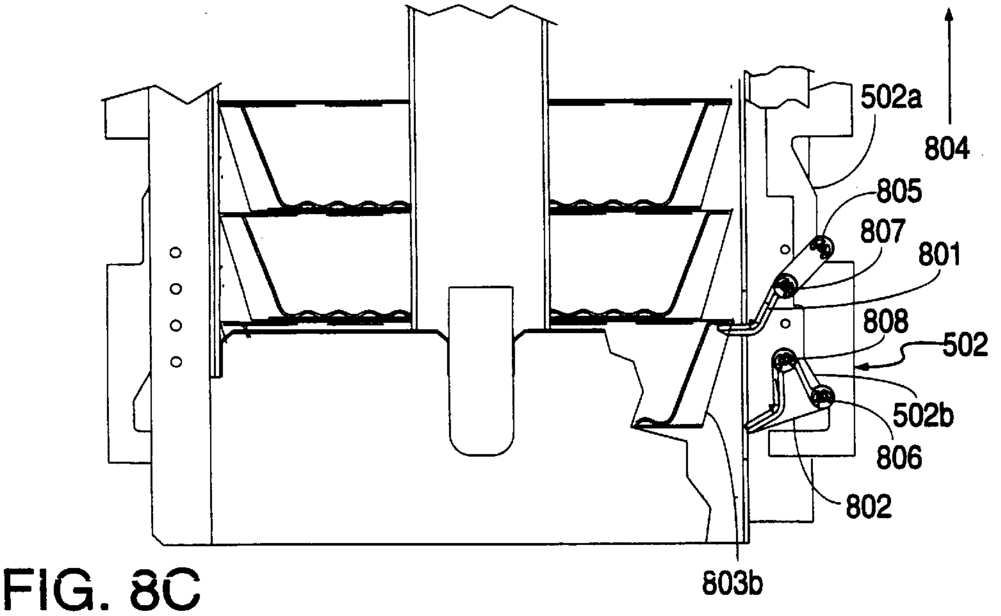
FIG. 8C is a cross-sectional view of a portion of the inventory magazine of FIG. 6A illustrating a second position of the cam mechanism for controlling the discharge of packaged food products from the inventory magazine.

FIG. 8A is a cross-sectional view of a portion of one of inventory magazines 202 illustrating a first position of one of cam mechanisms 603. FIG. 8B is an end view of one of cam mechanisms 603. FIG. 8C is a cross-sectional view of a portion of inventory magazine 202, illustrating a second position of cam mechanism 603. Retention levers 801 and 802 are mounted on pins 807 and 808, respectively, which are journaled in flanges that are part of inventory magazine 202, by extending pins 807 and 808 through sleeves formed as part of retention levers 801 and 802. Pins 805 and 806 are mounted through second sleeves formed as part of retention levers 801 and 802. A spring 809, mounted on the sleeve of lever 801 through which pin 807 extends, biases retention lever 801 in a counterclockwise direction about pin 807, as viewed in FIG. 8A. A spring 810, mounted on the sleeve of lever 802 through which pin 808 extends, biases retention lever 802 in a counterclockwise direction about pin 808, as viewed in FIG. 8A.

In the position of inventory magazine release rod 502 shown in FIG. 8A, retention lever 802 contacts a lip of a lowest packaged food product 803*a* and holds packaged food product 803*a* in place in inventory magazine 202.

Retention lever 802 is held in position to hold packaged food product 803a by contact of pin 806 with cam surface 502*b*.

When inventory magazine release rod 502 is raised in the direction of arrow 804, pins 805 and 806 move along cam surfaces 502*a* and 502*b*, respectively, causing retention lever 801 to rotate about pin 807 in a clockwise direction and retention lever 802 to rotate about pin 808 in a counter-clockwise direction. When inventory magazine release rod 502 is raised as high as possible by magazine actuator motor 501, as shown in FIG. 8C, retention lever 802 rotates to a sufficient degree to allow retention lever 802 to release packaged food product 803*a*. At the same time, retention lever 801 rotates to a sufficient degree to allow retention lever 801 to contact a lip of a packaged food product 803*b*, thereby holding packaged food product 803*b* (and the stack of packaged food products supported by packaged food product 803) in place in inventory magazine 202. Importantly, cam surfaces 502*a* and 502*b* are matched with each other so that retention lever 801 contacts packaged food product 803*b* before retention lever 802 releases packaged food product 803*a*. Additionally, the shape and size of retention levers 801 and 802 are chosen so as to retain and release packaged food products, as described above, when operated together with inventory magazine release rod 502 and associated cam surfaces 502*a* and 502*b*.

Though only one set of retention levers 801 and 802, and inventory magazine release rod 502 are described, it is to be understood that a corresponding set of retention levers and inventory magazine release rod are formed on an opposite side of the packaged food products so that the packaged food products are retained and released as described above.

Consequently, as a result of movement of inventory magazine release rod 502, a packaged food product at the bottom of each of the three stacks of packaged food products within inventory magazine 202 is dropped from the stack. For the lowest stack, this results in dropping the bottom packaged food product in the stack on to food delivery door 204. For each of the two remaining stacks in each inventory magazine 202, this results in dropping the bottom packaged food product in the stack to the top of the next lowest stack of food products. If no packaged food products remain in a stack, no packaged food product is dropped from the stack.

Figures 9A, 9B:
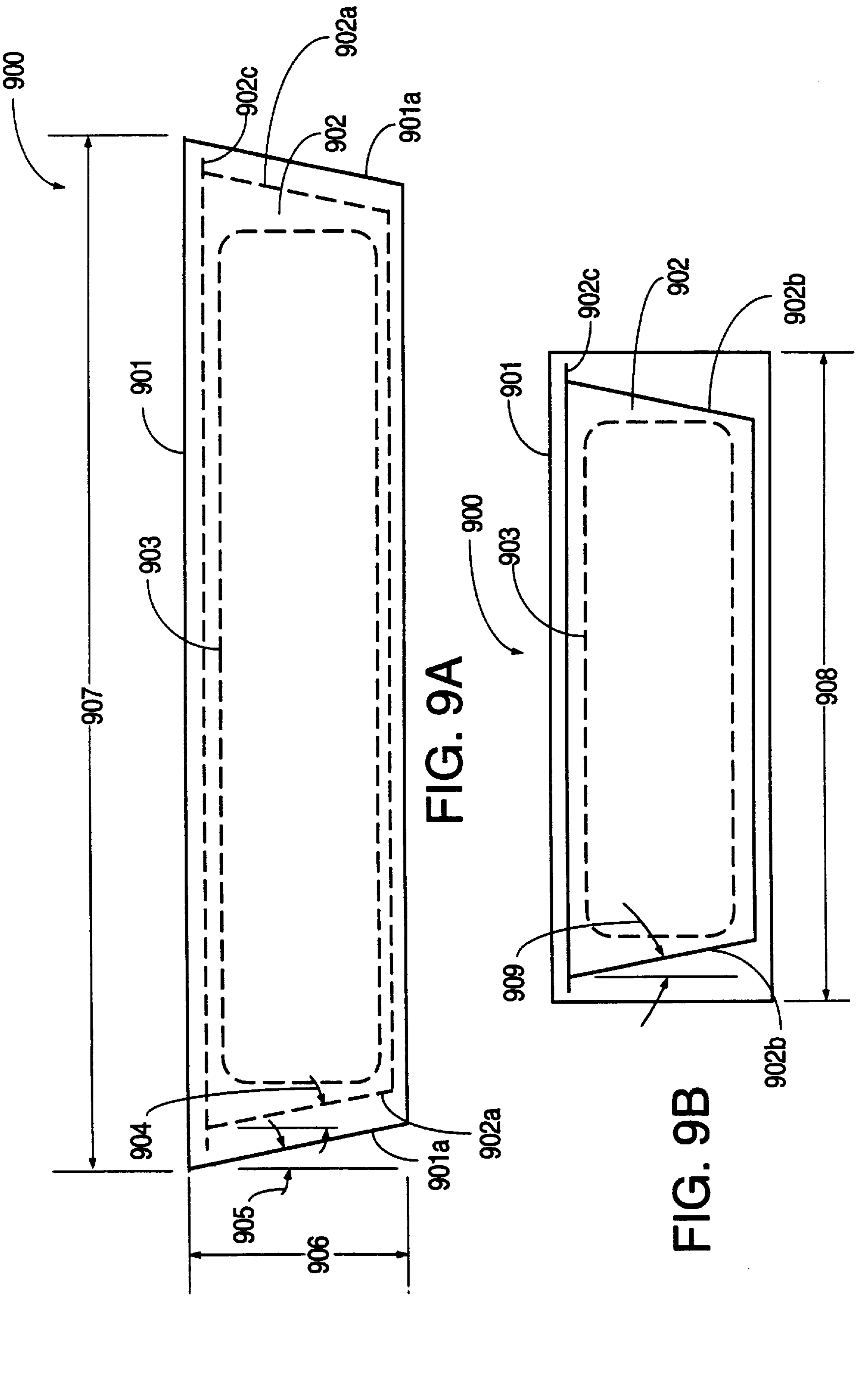
FIGS. 9A and 9B are a side view and end view, respectively, of a packaged food product including a package sleeve and tray according to the invention.

FIGS. 9A and 9B are a side view and end view, respectively, of a packaged food product 900 including a package sleeve 901 and a tray 902 according to the invention. A food item 903 lies within tray 902. Package sleeve 901 has a length 907 and width 908 that are made as large as possible while still allowing package sleeve 901 to fit within one of inventory magazines 202. Package sleeve 901 also has a height 906 that is chosen to be compatible with the height of tray 902.

Package sleeve 901 is formed with beveled sides 901*a* so that the upper surface of package sleeve 901 is longer than the bottom of package sleeve 901. An angle 905 measured between a plane perpendicular to the upper surface of package sleeve 901 and a beveled side 901*a* is, in one embodiment, approximately 16°.

Tray 902 is also formed with beveled sides 902*a* and 902*b* so that the upper surface of tray 902 is both longer and wider than the bottom surface of tray 902. An angle 904 measured between a plane perpendicular to the upper surface of tray 902 and a beveled side 902*a* is, in one embodiment, approximately 19°. An angle 909 measured between a plane perpendicular to the upper surface of tray 902 and a beveled side 902*b* is, in one embodiment, approximately 170. Tray 902 also has a lip 902*c* formed around the upper periphery of tray 902.

The beveled sides of package sleeve 901 and tray 902 allow retention levers 801 and 802 of cam mechanisms 603 to grip the upper portion of package sleeve 901, while preventing retention levers 801 and 802 from contacting the bottom portion of package sleeve 901 or tray 902.

After packaged food product 803*a* is dropped, magazine actuator motor 501 continues to rotate roller 509 and crank 511 so that inventory magazine release rod 502 is lowered, i.e., moves in the direction opposite that of arrow 804. Cam surfaces 502*a* and 502*b* interact with pins 805 and 806 to reverse the motion of retention levers 801 and 802 described above. Again, cam surfaces 502*a* and 502*b* are matched to each other so that retention lever 802 is in place to catch packaged food product 803*b* before retention lever 801 releases packaged food product 803*b*.

A magazine actuator switch monitors rotation of magazine actuator motor 501, signalling to control board 208 to de-activate magazine actuator motor 501 when roller 509 has completed a rotation.

Eventually, all 30 packaged food products are distributed from each inventory magazine 202. When this occurs, vending machine 100 signals to a user that a particular food product is no longer available. As discussed above, and shown in FIGS. 6A through 6E, one empty magazine indicator 606 is attached at the bottom of each inventory magazine 202. So long as at least one packaged food product is present in inventory magazine 202, the packaged food product contacts cam 608 of empty magazine indicator 606, causing cam 608 to rotate about rod 613 of bracket 607 to a first position shown in FIG. 6D. In this position, Hall effect sensor 611 is not aligned with magnet 612, thereby indicating to control board 208 that inventory magazine 202 is not empty.

When no packaged food products are present in inventory magazine 202, cam 608 is biased by spring 614 to rotate forward to a second position shown in FIG. 6C. In this position, Hall effect sensor 611 is aligned with magnet 612, thereby notifying control board 208 that inventory magazine 202 is empty. When one of inventory magazines 202 is empty, control board 208 causes a display bar, e.g., a series of three dashes, to be displayed in the appropriate price display 110, rather than the price for that food product. Further, control board 208 does not process any request (as manifested by depression of the appropriate food selection button 111) for cooking of the food product that is no longer present in the inventory magazine 202.

Figure 7F:
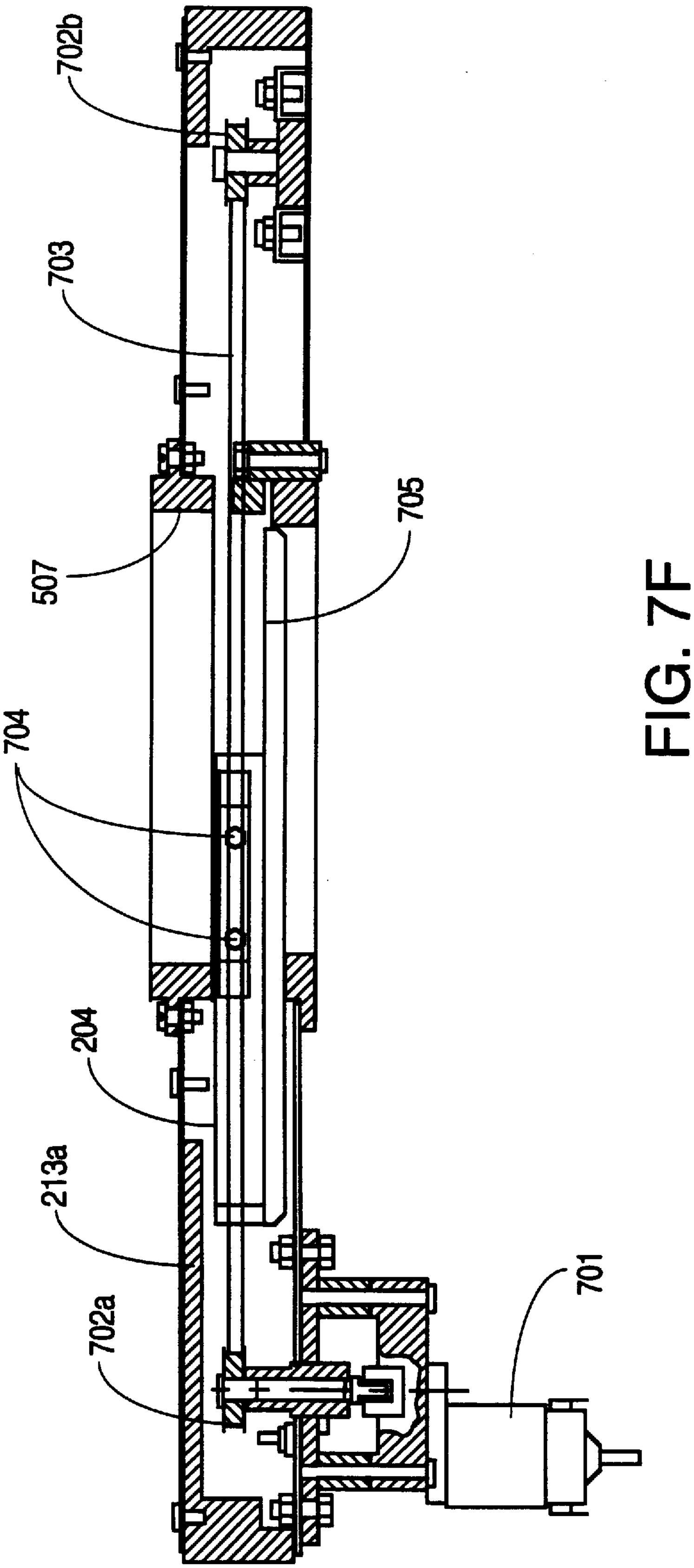
FIG. 7F is a cross-sectional view of the floor of the refrigeration compartment, illustrating a mechanism for opening and closing the food delivery door.

FIG. 7F is cross-sectional view of floor 213*a* of refrigeration compartment 213, illustrating a mechanism for opening and closing food delivery door 204. A food delivery door motor 701 drives a combination of shafts and gears to rotate a pulley 702*a*. A belt 703 is wound around pulleys 702*a* and 702*b*. Food delivery door 204 is attached with a clamp 704 to belt 703. When pulley 702*a* is rotated, belt 703 is driven to move food delivery door 204 (shown in a partially open position in FIG. 7F) with respect to the opening in floor 213*a* defined by frame 507. Belt 703 is moved between each of two extreme positions to open and close food delivery door 204 which moves laterally between floor 213*a* and guide 705.

After a packaged food product has been dropped on to food delivery door 204 (FIG. 2), control board 208 activates food delivery door motor 701 (FIG. 7F) to open food delivery door 204. A sensor mounted adjacent food delivery door 204 signals to control board 208 when food delivery door 204 is fully open, at which time control board 208 de-activates food delivery door motor 701. When food delivery door 204 is opened, the packaged food product drops on to delivery tray 205, which is in a first position.

After a packaged food product has been dropped on to delivery tray 205, control board 208 activates food delivery door motor 701 to close food delivery door 204. Two Hall effect sensors are mounted in floor 213*a* adjacent food delivery door 204, and a magnet is mounted in door 204 such that the magnet is proximate one of the Hall effect sensors when door 204 is fully open or fully closed. One of the Hall effect sensors signals to control board 208 when food delivery door 204 is fully closed, at which time control board 208 de-activates food delivery door motor 701.

A software program controls the operation of inventory carousel motor 711 as it drives inventory carousel 201 to a new position, allowing a particular food item to be transferred to the oven. Each of inventory magazines 202 is identified by an index number and, when a customer orders a food item, the microprocessor within control board 208 instructs motor 711 to move inventory carousel 201 until the magazine 202 identified by the target index numbers is located above food delivery door 204.

Figure 10A:
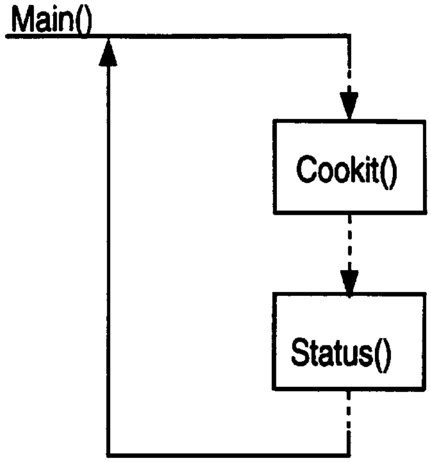
FIGS. 10A through 10L illustrate flowcharts of software that the microprocessor runs to control the inventory carousel motor.
Figure 10B:
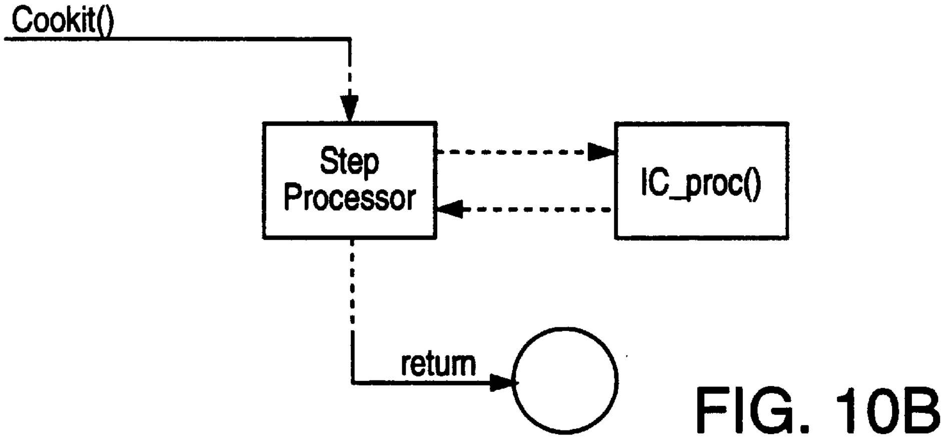

FIGS. 10A–10L illustrate flowcharts of the software that the microprocessor runs to control motor 711. The Main program is illustrated in FIG. 10A, which shows that the Main program cycles through subprograms designated Cookit and Status. Additional subprograms are in the Main program but are not shown in FIG. 10A. FIG. 10B illustrates that the Cookit subprogram includes a program designated Step Processor. From Step Processor, the microprocessor cycles to a program designated IC__proc and returns to Step Processor. Cookit contains other programs and Step Processor cycles through other programs which are not illustrated in FIG. 10B.

Figure 10C:
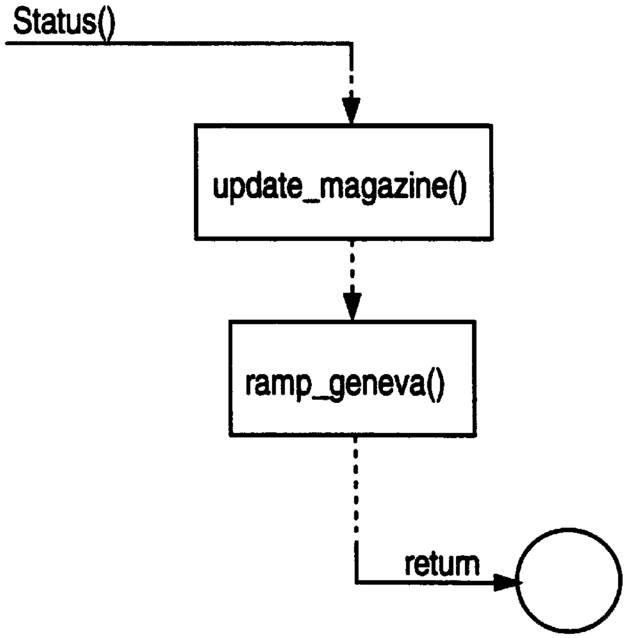

As shown in FIG. 10C, the Status subprogram includes programs entitled update__magazine and ramp__geneva, respectively, as well as other programs that are not shown.

Figures 1, 10D:
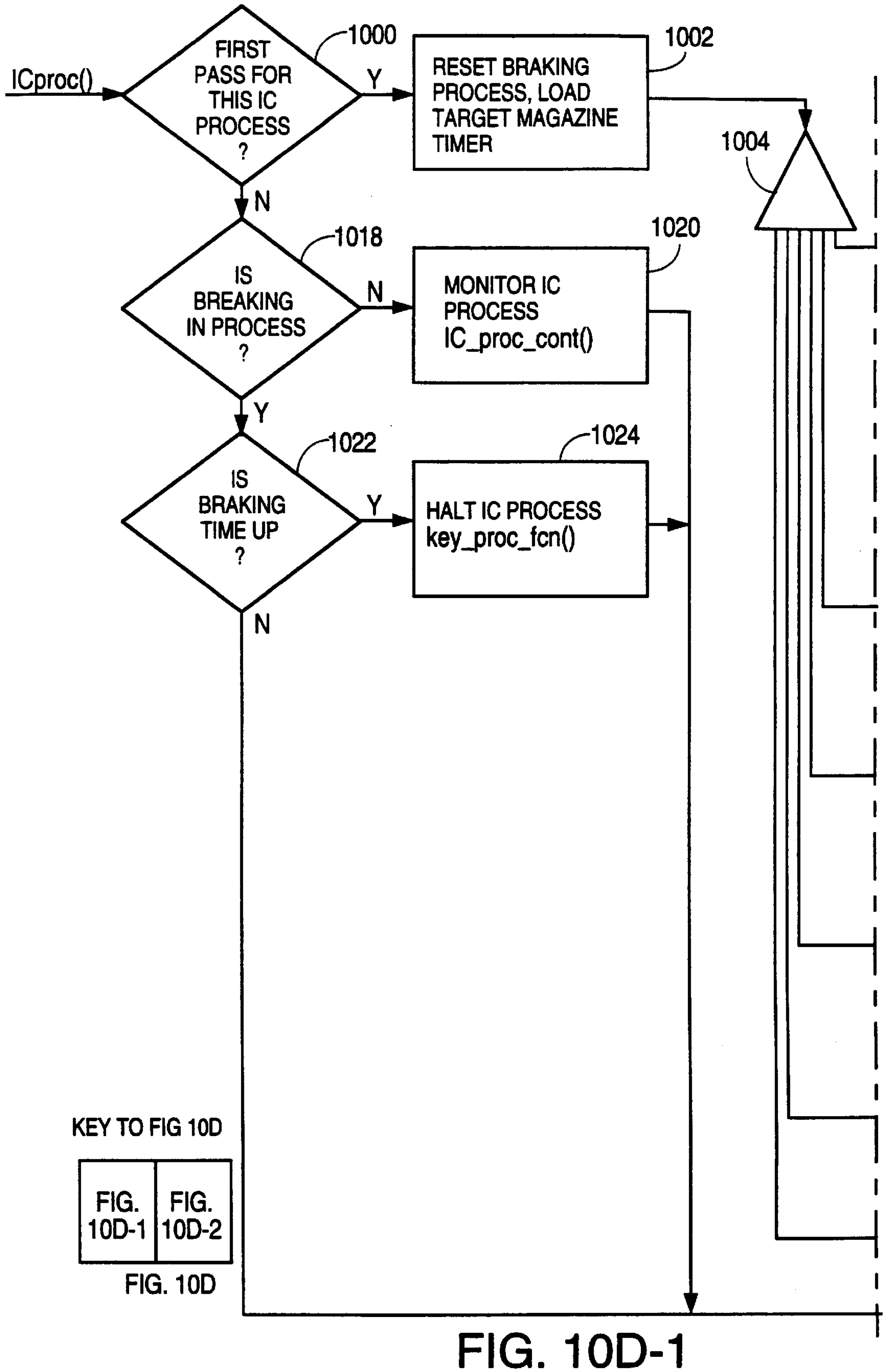
Figures 2, 10D:
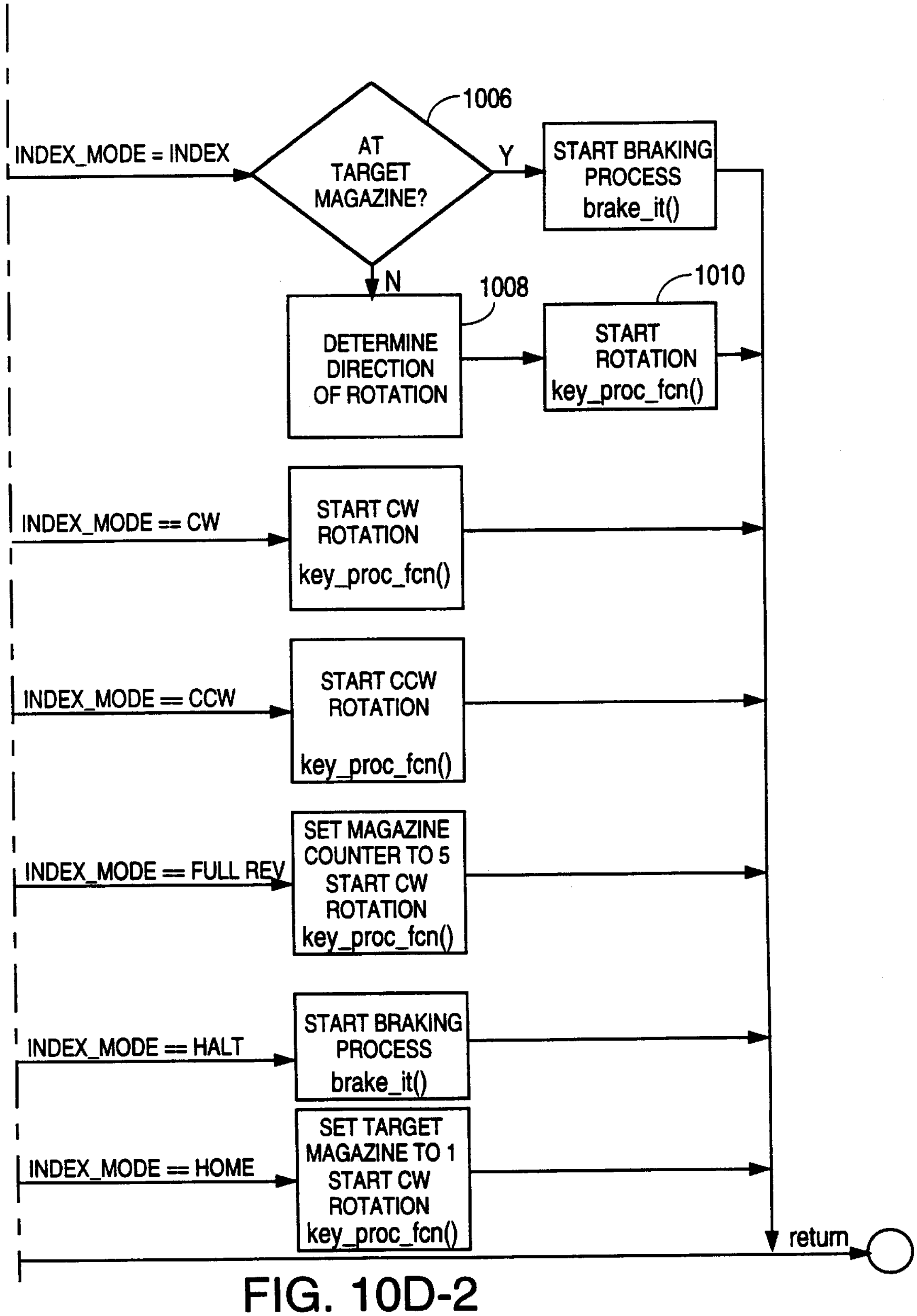

FIG. 10D illustrates a flowchart of the IC__proc program. At step 1000, a determination is made whether this is the first pass through this program since the previous instruction to move inventory carousel 201 was given. If the answer is yes, at step 1002 the braking process (described below) is reset and a "target magazine" countdown timer, the function of which is described below, is loaded. At step 1004, the program fans out into a number of "index modes". In normal operation, the index mode designated Index is selected, and at step 1006 a determination is made whether a target magazine 202 is indexed (i.e., positioned at the desired position over food delivery door 204). The indexing of a magazine 202 is identified by a switch which is thrown when a magazine 202 reaches a point just before it is positioned over delivery door 204. If a target magazine 202 is not indexed, the direction of rotation required to reach the target magazine 202 is determined in step 1008 and a program entitled key__proc__fcn is initiated to turn motor 711 on (step 1010).

Figure 7G:
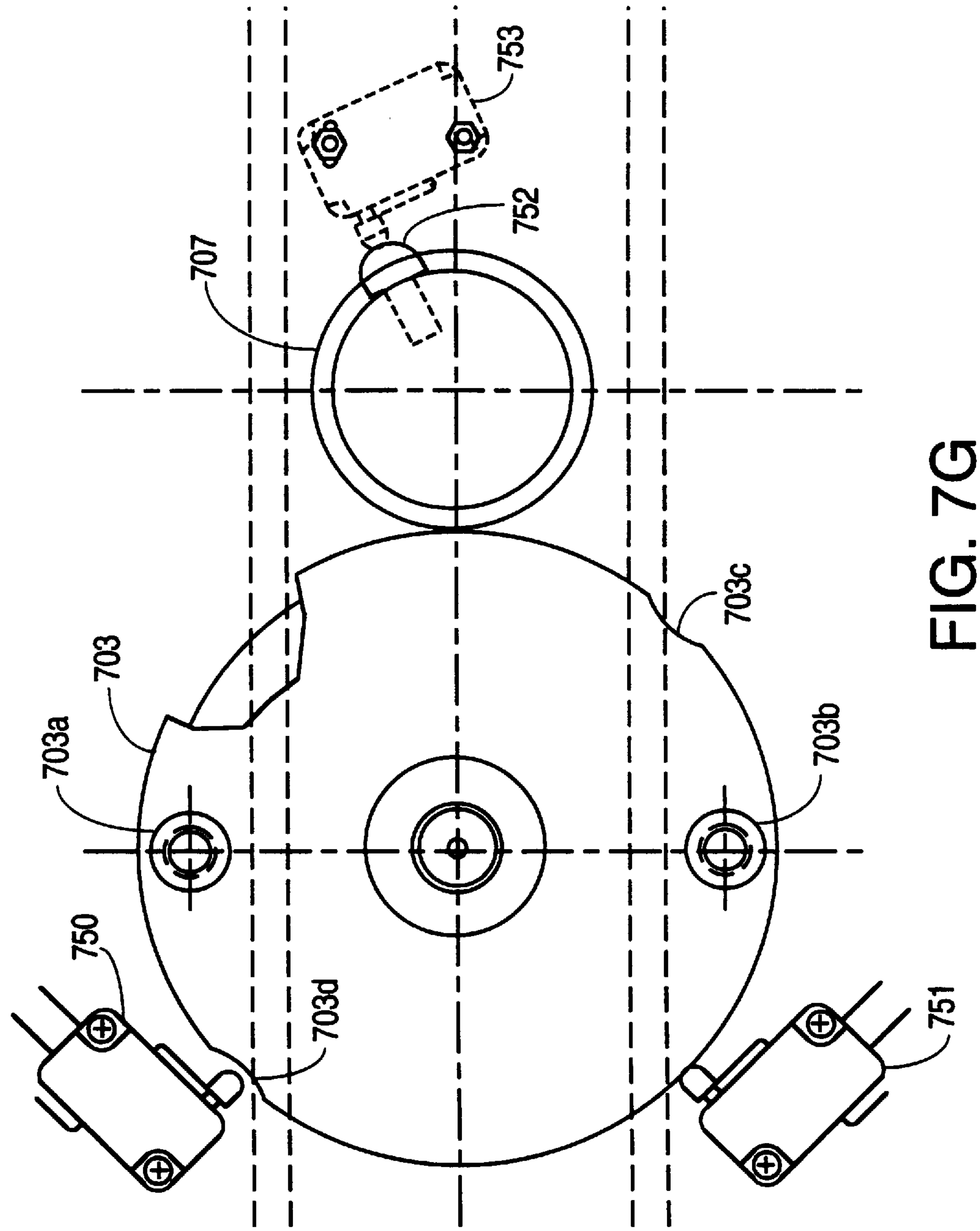
FIG. 7G is a plan view of the disk used to index the inventory magazines of the inventory carousel.

The position of inventory carousel 201 is monitored using switches which are triggered by detents on input disk 703. Since disk 703 rotates 180 degrees between index positions, two switches are used to detect index positions of carousel 201. Similarly, an additional detent and two additional switches are used to sense when carousel is at a midpoint between index positions. The function of the midpoint detection is described below. This structure is illustrated in FIG. 7G, where detents 703*c* and 703*d* are positioned 180 degrees apart on disk 703. A switch 750 detects when carousel 201 is indexed and a switch 751 detects when carousel 201 is at a midpoint between index positions.

A cam on shaft 707 is used to detect when inventory carousel 201 is at the "home" position (i.e., the position when the magazine 202 which has the index #1 is positioned above food delivery door 204). This structure is also shown in FIG. 7G, where shaft 707 has a screw 752 mounted on it, and a switch 753 detects when carousel 201 is at the home position. The microprocessor then keeps track of the position of carousel 201 by counting the indexing of magazines 202 and sensing the direction of rotation of carousel 201. This process is referred to as "orienting" the carousel.

Figure 10E:
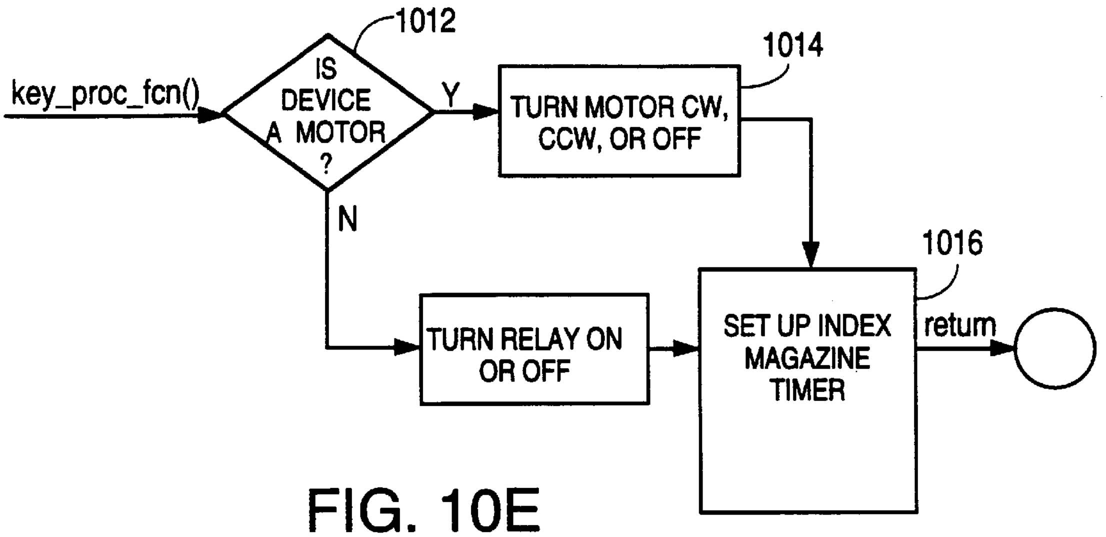

The key proc__fcn program is illustrated in FIG. 10E. This is a universal program which is operable with various electromechanical devices such as motors and relays. As shown in FIG. 10E, key__proc__fcn first determines whether the device is a motor (step 1012) and, if so, turns the motor on clockwise or counterclockwise or off (step 1014). In this case, the motor is turned on in the direction indicated by step 1008. Then, in step 1016 an "index magazine" countdown timer is set, the function of which is described below.

After starting the motor (step 1010), the microprocessor returns from the IC__proc program. The other index modes are normally used in diagnostic procedures. The index modes entitled CW (clockwise) and CCW (counterclockwise) are used to rotate the carousel in a particular direction. For this purpose, the key proc fcn program is used to start the motor in the appropriate direction. In the index mode entitled Full Rev (full revolution), a magazine counter is set to 5, and the key proc function program is initiated to rotate the carousel until the fifth magazine has passed the delivery point. In the indexed mode entitled Home, the magazine identified by the index #1 (the "Home" magazine) is set as the target magazine and the key__proc__func program is initiated to rotate the carousel.

On the next pass through the IC__proc program step 1000 yields a no answer, and at step 1018 it is determined whether braking is in progress. The braking process is described below. If braking is not in progress, the microprocessor proceeds to a program entitled IC__proc__cont (step 1020). If braking is in progress, step 1022 determines whether the braking time is up, and if it is not an exit is made from the IC__proc program. If the braking time is up, the key-proc__fcn program is used to turn motor 711 off (step 1024), and then an exit is made from the program.

Figure 10K:
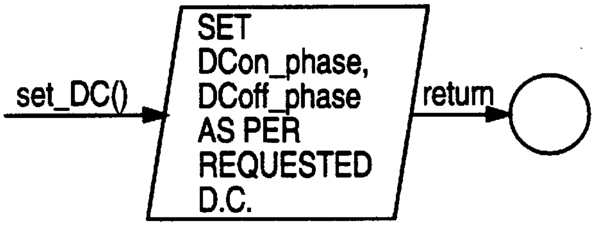
Figure 10G:
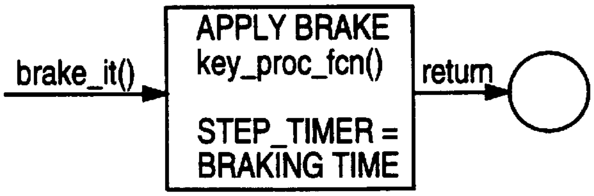
Figures 1, 10F:
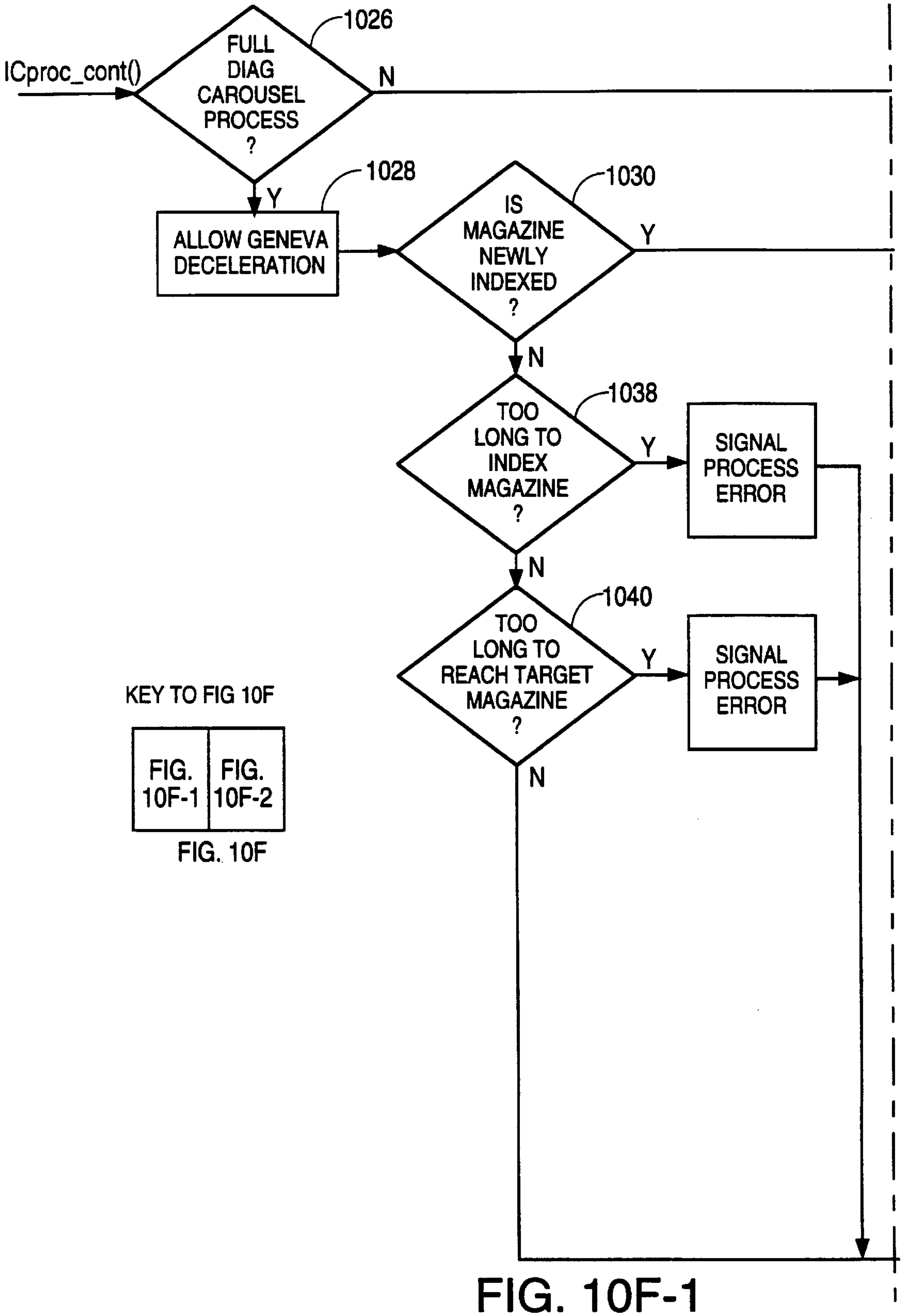
Figures 2, 10F:
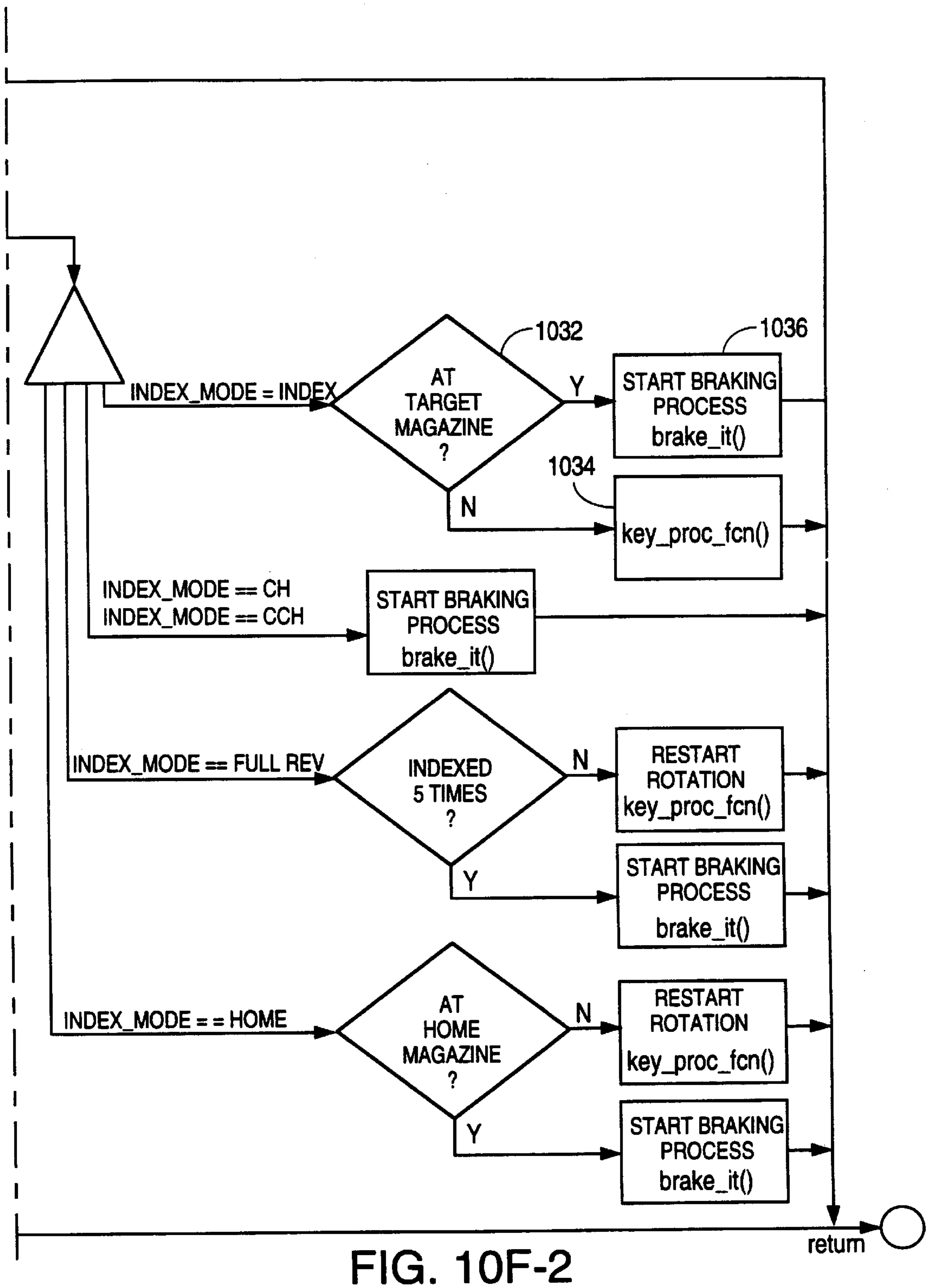

The IC__proc__cont program is illustrated in FIG. 10F. Initially, in step 1026 a determination is made whether inventory carousel 201 is in a "full process" or whether it is operating in a "partial process". Normally, when the carousel is being moved from position to position, it will be operating in a full process. At step 1028, a flag is set to allow the Geneva mechanism to be decelerated, a process which is described below. At step 1030 a determination is made whether a magazine 202 has been newly indexed, in other words, whether a magazine 202 has arrived at the delivery position following the previous path through this program. If so, the program proceeds to a fan out similar to that described in connection with the IC__proc program (FIG. 10D) which includes a number of index modes. As indicated above, the normal index mode is Index. At step 1032 it is determined whether the target magazine 202 is indexed. If not, the key__proc__fcn program is called (step 1034) to reload an "index magazine" countdown timer (step 1016), the function of which is described below, and if so, the brake__it program is entered (step 1036). The brake__it program is illustrated in FIG. 10G, which shows that the key__proc__fcn program is used to apply a brake to carousel 201. This is accomplished by means of a bidirectional motor driver which is used to short the coil of motor 711 and thereby apply a braking force to the rotating carousel 201. Bidirectional motor drivers are well known and available from many sources. Also, during the brake__it program, a timer is set to a constant braking time, determined by the angular momentum of the carousel to ensure that the carousel has reached a stationary condition when the timer reaches 0. In a preferred embodiment, the constant braking time is set at 0.3 sec.

Referring again to FIG. 10F, in the CW or CCW index modes, the brake_it program is started. In the Full Rev index mode, it is determined whether the carousel has passed an index 5 times, and in the Home index mode it is determined whether the carousel has reached the home position. Since each of these actions occurs after a magazine is newly indexed (step 1030), the CW and CCW index modes brake the carousel when the first magazine arrives at the delivery point, the Full Rev index mode brakes the carousel when the fifth magazine has arrived at the delivery point, and Home Index mode stops the carousel when the home magazine (Index #1) has arrived at the delivery point.

If a magazine has not been newly indexed (step 1030), the index magazine timer (reloaded at step 1034) is consulted to determine whether it has taken too long to reach an index magazine (step 1038). Then, the target magazine timer (loaded at step 1002) is consulted to determine whether it has taken too long to reach the target magazine (step 1040). In either event, an error signal is generated.

Referring again to FIGS. 10A–10C, after the microprocessor leaves the IC_proc program, it returns to the Step Processor and proceeds to the Status program. The Status program includes the update_magazine and ramp_geneva programs.

Figures 2, 10H:
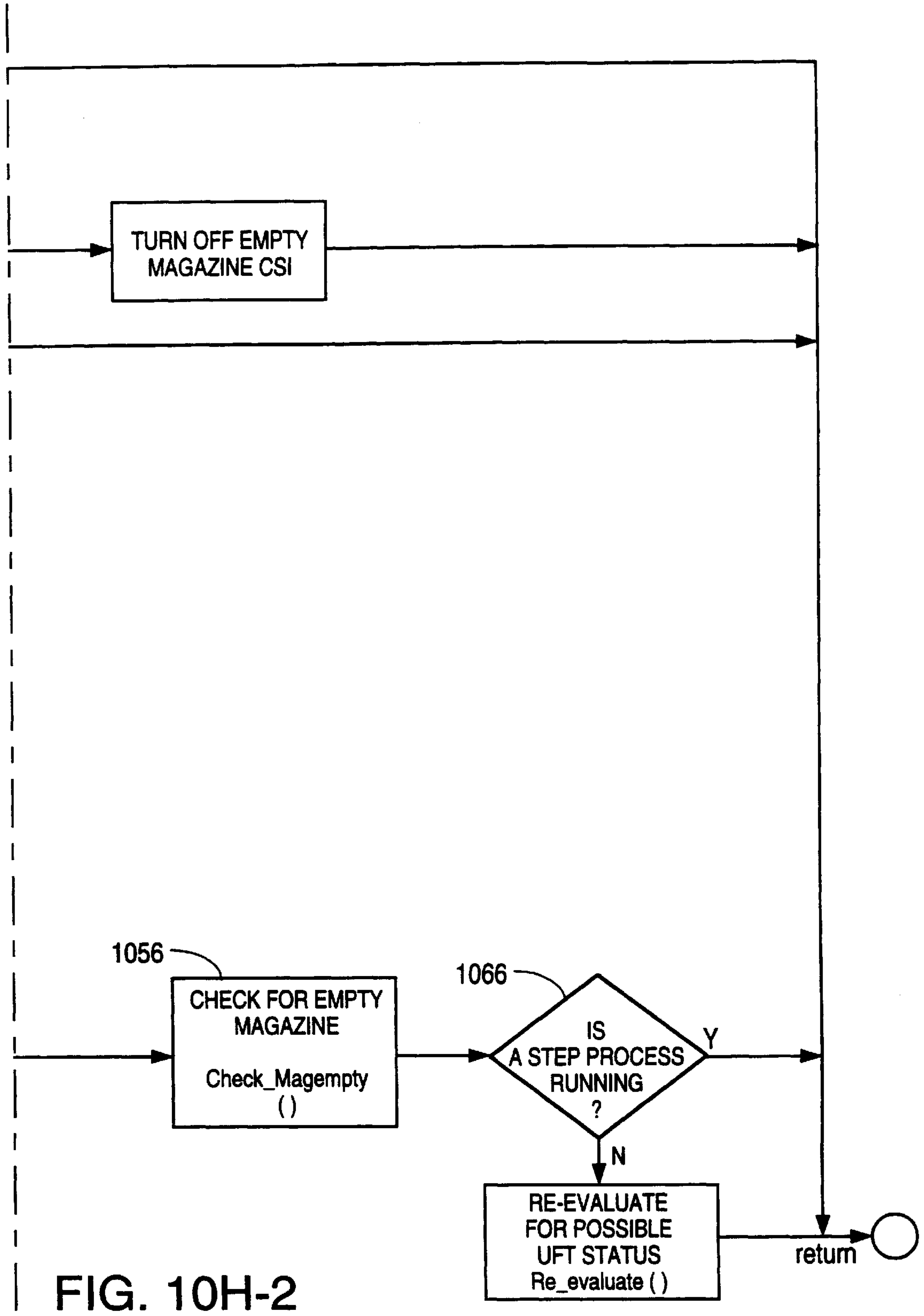
Figure 10I:
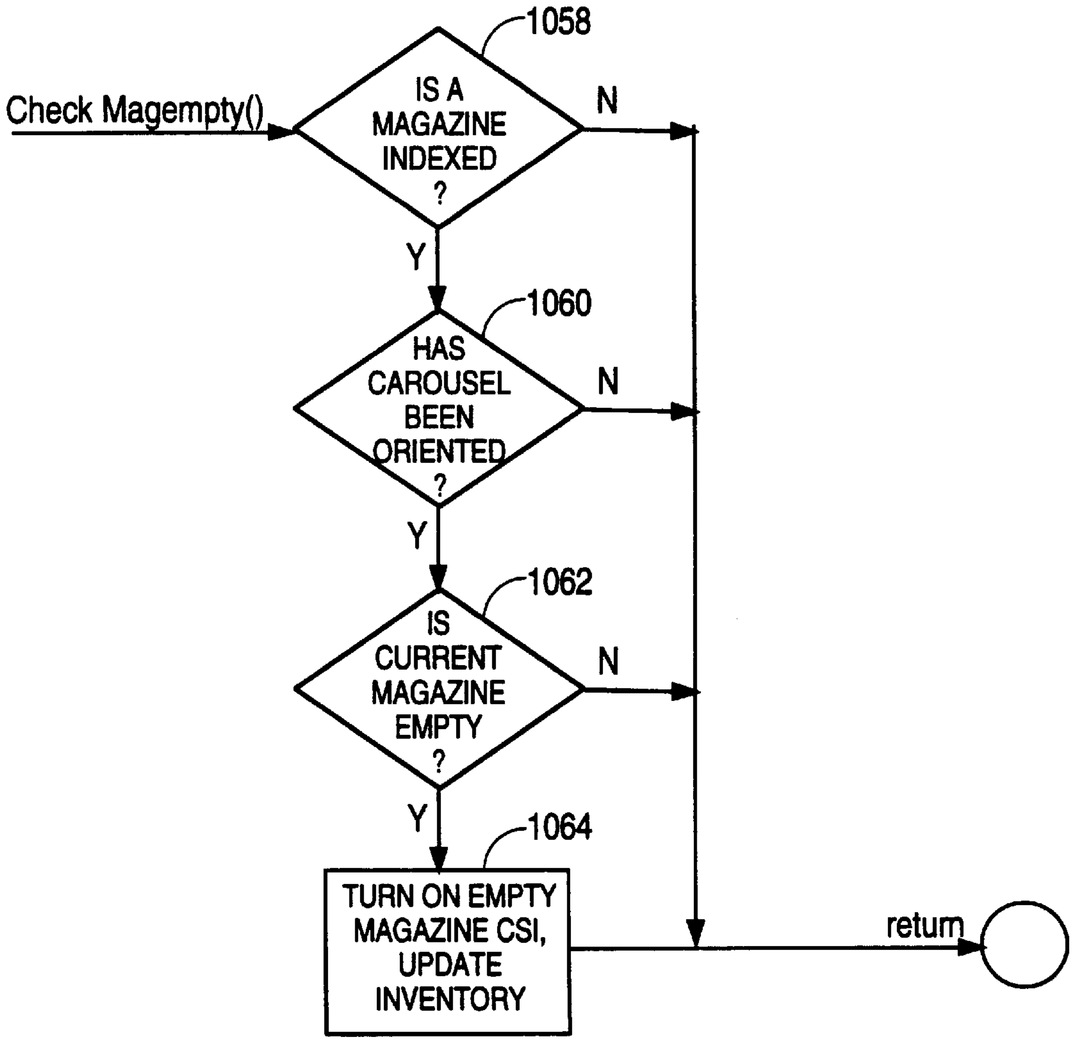
Figures 1, 10J:
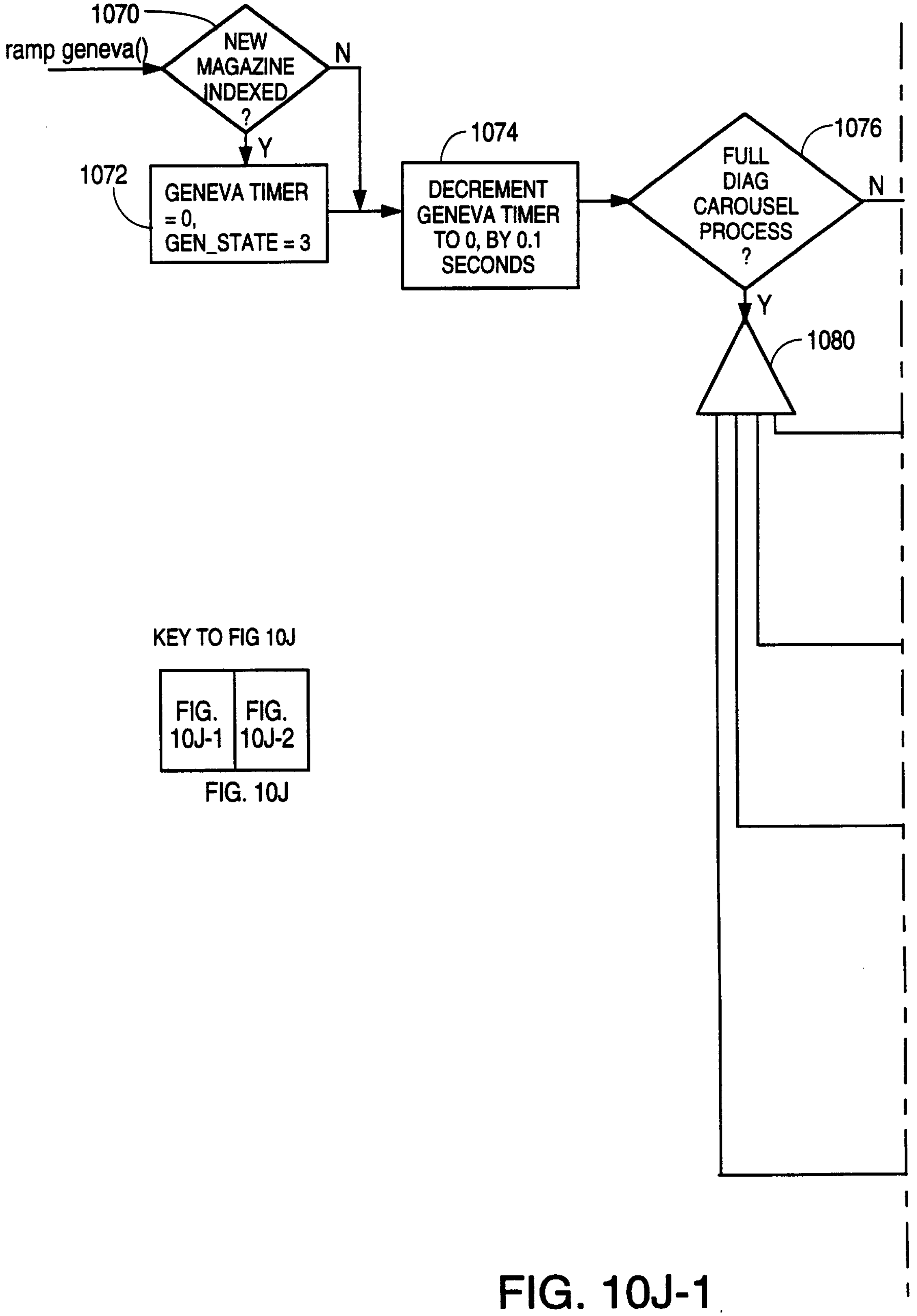
Figures 2, 10J:
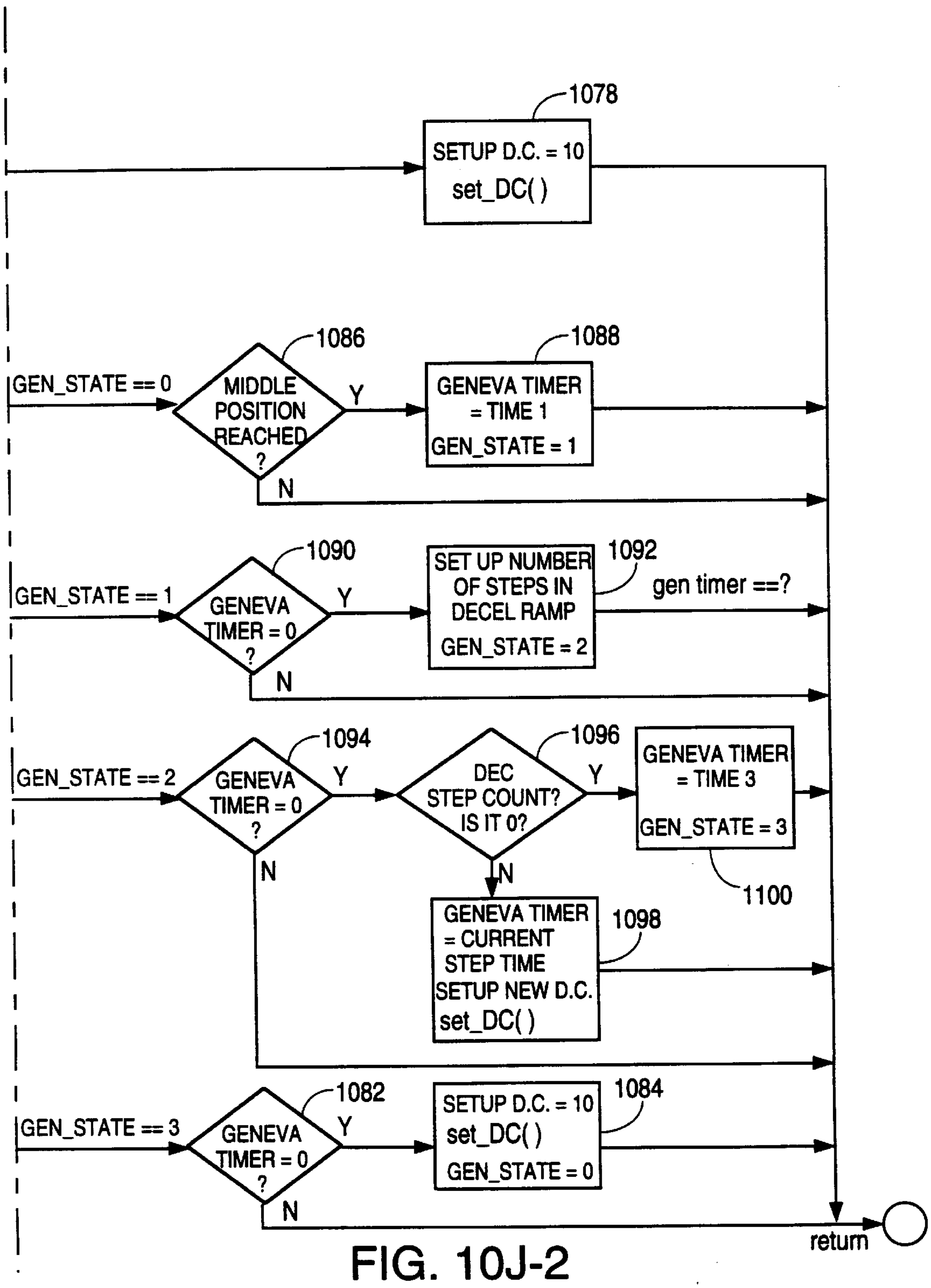
Figure 10L:
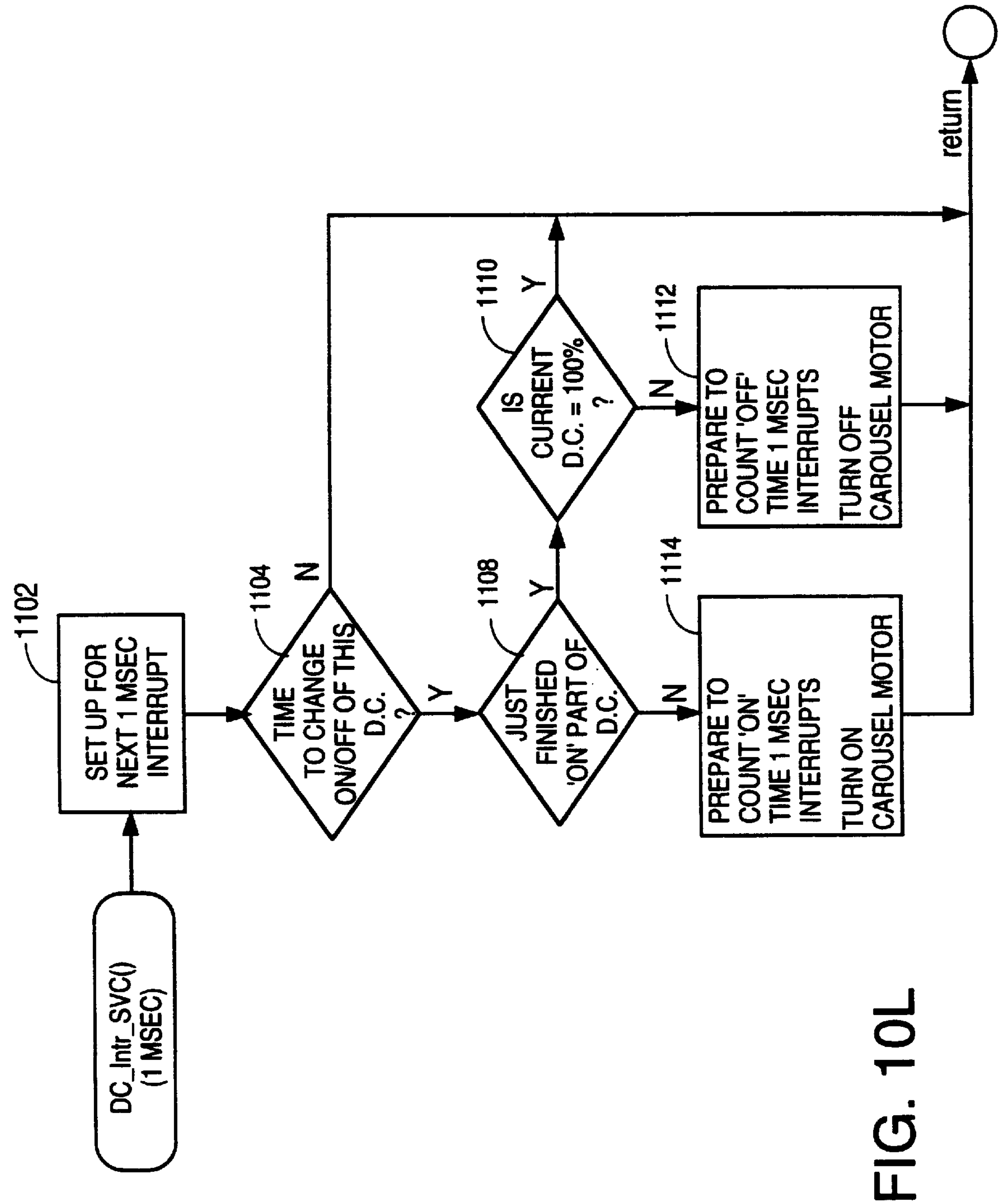

The update_magazine program is illustrated in FIG. 10H. Step 1042 determines whether a magazine 202 is currently indexed, and if so step 1044 determines whether the magazine 202 is newly indexed (i.e., whether it has become indexed since the last pass through this program). As indicated above, this means in effect that a magazine 202 has just reached the delivery point. If a magazine 202 is newly indexed, a "New Magazine" flag is set in the carousel rotation process (FIG. 10F) and the geneva deceleration process (FIG. 10J). Next, it is determined whether the recently indexed magazine 202 is the home magazine (step 1050), using switch 753 shown in FIG. 7G. If so, the current magazine 202 is indexed as 1 (step 1052); if not, it is determined which magazine 202 has just been indexed (step 1054).

The program then proceeds to the Check_Magempty program (step 1056). This program is illustrated in FIG. 10I. After rechecking whether a magazine 202 is indexed and whether the carousel has been oriented (steps 1058 and 1060) the empty magazine indicator 606 is checked to determine whether the currently indexed magazine is empty (step 1062). If the current magazine is empty, an "Empty Magazine CSI" (component status indicator) light is turned on and the inventory is updated (step 1064). The "Empty Magazine CSI" light is located on the inside of the service door 101 and is used by service personnel to determine when one of magazines 202 is empty without opening the door to refrigeration compartment 213.

Referring again to FIG. 10H, after leaving Check_Magempty the microprocessor determines whether a step process is running (step 1066) and if so the program is exited. If a step process is not running, the Re_evaluate program is entered. The Re_evaluate program checks on a number of mechanical and product conditions and is able to shut the vending machine down in the event of a problem. If a step process is running (i.e., a food product is being processed), it is undesirable to shut the machine down until the process has been completed.

If step 1042 indicates that a magazine 202 is not indexed, a determination is made whether this condition is "new", i.e., whether a magazine 202 was indexed on the last pass through the program (step 1068). If no magazine 202 was indexed on the last pass, the microprocessor proceeds to the end of the program. The same occurs if a no answer is given to step 1044, meaning that the magazine 202 was indexed on the previous pass through the program.

If step 1068 indicates that the magazine 202 is newly unindexed, the current mag is set at 0, meaning that no magazine 202 is indexed, and the "Empty Magazine CSI" light is turned off. Thus the empty magazine indicator, which is turned on at step 1064 (FIG. 10I), remains on only while the empty magazine is indexed.

Figure 11:
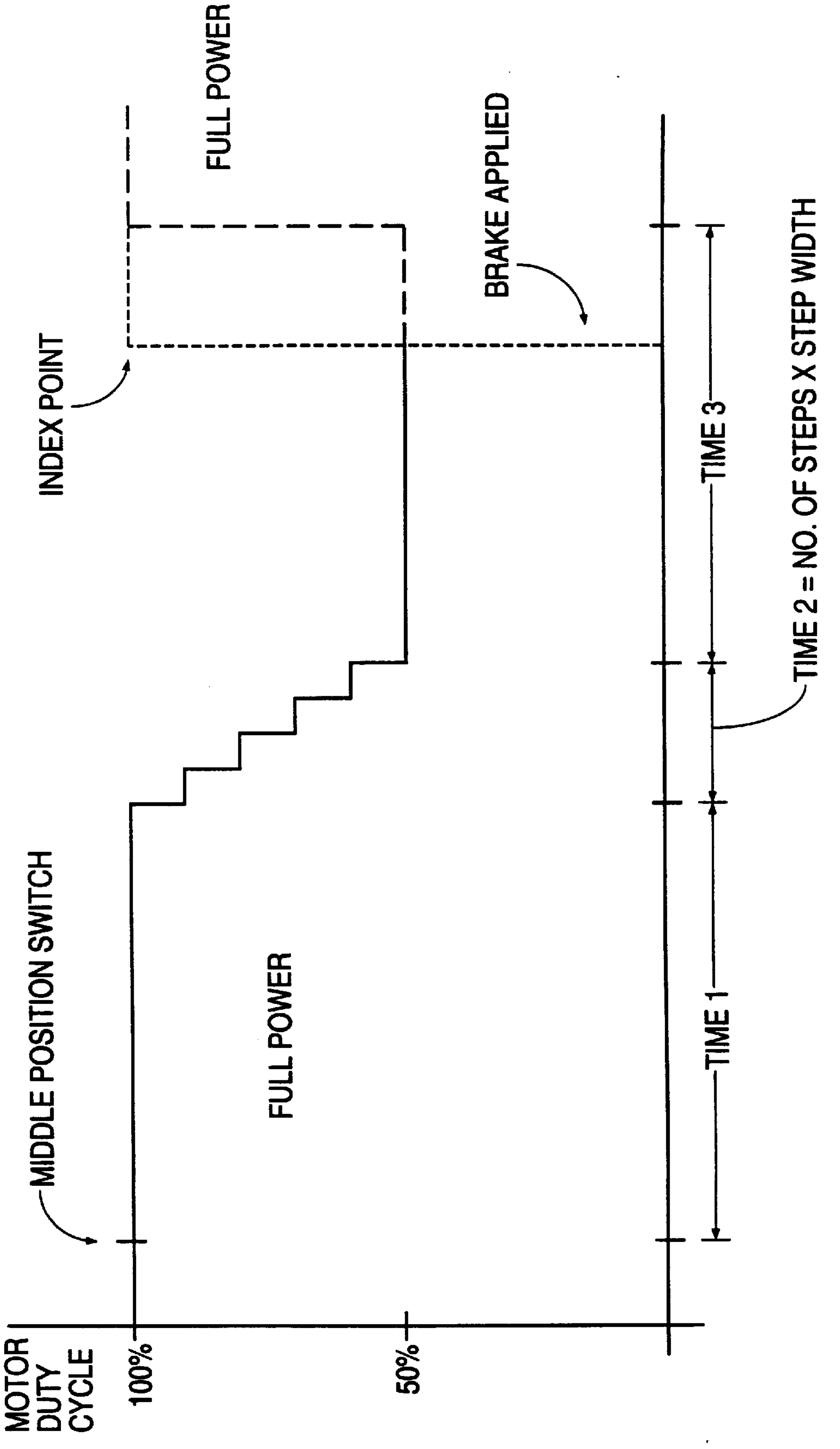
FIG. 11 illustrates the operation of the inventory carousel motor during the ramp_geneva program.

As shown in FIG. 10C, the ramp_geneva program follows the update_magazine program. FIG. 11 illustrates the operation of the motor 711 during the ramp_geneva program. As shown in FIG. 7G, switch 751 senses detents 703*c* and 703*d* on disk 703 and indicates whenever the carousel 201 arrives at a position midway between two magazines 202. When this "middle position" switch is triggered, the motor 711 continues to operate at full power for a duration equal to Time 1. At Time 1, motor 711 begins to ramp down until it reaches a specified percentage of power. This is shown in FIG. 11 as a "duty cycle" percentage, which represents the percentage of the time that a voltage is applied to motor 711. When motor 711 has reached the target duty cycle, it continues at the same reduced level for a Time 3 or until the next magazine 202 is indexed. If the next magazine 202 is the target magazine, braking is applied to carousel 201. Otherwise, motor 711 returns to full power at whichever of the foregoing events occurs first.

This "ramping down" of motor 711 reduces the acceleration forces on carousel 201 and thereby reduces wear on carousel 201 and its associated mechanical devices. With the Geneva mechanism illustrated in FIGS. 7A and 7C–7E, the carousel 201 reaches a zero angular velocity momentarily at each index point (FIGS. 7C and 7E) and a maximum angular velocity at the midpoint between index points (FIG. 7D). Between the midpoint (FIG. 7D) and the following index point (FIG. 7E) the carousel 201 decelerates rapidly and, particularly when carousel 201 is fully loaded with food packages, severe vibrations and wear may occur at the index point (FIG. 7E). To avoid this condition, it has been found advantageous to reduce the power to motor 711 during the second half of the time interval between index points, which is when carousel 201 is decelerating.

This process is performed by the ramp_geneva program, which is illustrated in FIG. 10J. At step 1070 it is determined whether a magazine 202 has been newly indexed. If so, a timer designated Geneva is set to zero and a Gen_State is set to 3. This occurs at step 1072. The Geneva timer is decremented by intervals of 0.1 second. Each time step 1074 is reached, a check is made to find out whether 0.1 second has passed since the last time the Geneva timer was decremented. If so, the Geneva timer is decremented (by 0.1 second); otherwise, the Geneva timer is left at is current setting.

After the program leaves step 1072, since the Geneva timer is already set at zero, nothing occurs at step 1074 during this pass through the program. At step 1076, a determination is made whether a full process is being performed. This is identical to the decision at step 1026 (FIG. 10F). As indicated above, the system is operating at "full process" in normal operation; it generally operates at partial process when a diagnostic or test function is being performed. If motor 711 is not operating at full process, the duty cycle is set at 100% in step 1078. This is performed in a program designated set_DC, which is illustrated in FIG. 10K. The set_DC program essentially applies the input voltage to motor 711 during a specified percentage of the time. This is accomplished using the EC_Intr_SVC program shown in FIG. 10L. (Note that in step 1078 and the remainder of FIG. 10J, the numeral "10" is used to indicate a 100% duty cycle.)

If the system is operating in a full process, the program passes through a fanout 1080 to one of several GEN_States. Since GEN_State 3 was set at step 1072, the program passes to GEN_State 3. Since the Geneva timer is set at zero (step 1072), the microprocessor passes through step 1082 to step 1084 where, using the set_DC program, the duty cycle of motor 711 is set at 100%. In addition, the GEN_State is set to zero.

On the next pass through the ramp_geneva program, step 1072 is bypassed (since the magazine 202 is not newly indexed), and the microprocessor proceeds through step 1076 to GEN_State 0. At step 1086 the microprocessor determines whether the middle position switch has been activated. If not, it exits the ramp_geneva program. Since the GEN_State has not been reset, the microprocessor continues to cycle through the ramp_geneva program on this path until it receives an indication that the middle position limit switch has been thrown. When this occurs, the microprocessor passes from step 1086 to step 1088. In step 1088, the Geneva timer is set to Time 1 which, as shown in FIG. 11, is the time from the middle position indication to the beginning of the ramp down. Also, in step 1088 the GEN_State is set to 1.

On the next pass through the ramp_geneva program, the Geneva timer is decremented to a time equal to Time 1 minus 0.1 seconds in step 1074, and the microprocessor proceeds to GEN_State 1 again. It continues to cycle through GEN_State 1 until at step 1090 it is determined that the Geneva timer equals zero.

When the Geneva timer is zero, the microprocessor proceeds from step 1090 to step 1092 where the number of steps in the deceleration ramp is set and the GEN_State is set to 2.

On the next pass through the program, GEN_State 2 is selected and at step 1094, since the Geneva timer remains at zero, the microprocessor proceeds to step 1096. In step 1096, the number of steps in the deceleration ramp (set at step 1092) is decremented by 1 and, unless the result is zero, the microprocessor proceeds to step 1098. At step 1098 the Geneva timer is set to the desired width of a single deceleration step, and the duty cycle of the motor is adjusted downward to a desired level. In the preferred embodiment, the duty cycle begins at 100% and is adjusted downward in intervals of 10%, so that after the first adjustment the duty cycle is 90%. In making this adjustment, the set_DC program (FIG. 10K) is used to adjust the on and off times appropriately.

With the Geneva timer set at the desired step time, it is decremented by 0.1 second intervals until it reaches zero. Until the Geneva timer again reaches zero, the microprocessor exits the program from step 1094, and thus motor 711 continues to operate at the adjusted duty cycle. When the Geneva timer has reached zero, the microprocessor again enters step 1096 where the step count is decremented, and step 1098 where the Geneva timer is again set to the step time and the duty cycle is adjusted. The duty cycle then remains the same until the Geneva timer again reaches zero.

When the step count has been decremented to zero at step 1096, the microprocessor enters step 1100. At step 1100, the Geneva timer is set to a time equal to Time 3 and the GEN_State is set to 3. On the next pass through the ramp_geneva program, GEN_State 3 is selected, and until the Geneva timer has reached zero, the microprocessor continues to exit the program from step 1082. When Time 3 has elapsed, the microprocessor passes from step 1082 to 1084, where the duty cycle is again set at 100%.

As noted above, the process performed by the ramp_geneva program (illustrated in FIG. 11) occurs during each interval between index points, and it is triggered by the operation of the middle position switch. If the next magazine 202 is the target magazine, the braking process will start at step 1036 (FIG. 10F) before Time 3 has elapsed. This is illustrated in FIG. 11. Thus, as the target magazine is approached, the resetting of the duty cycle to 100% (step 1084 in FIG. 10J) is superseded by the application of the braking process, and the carousel comes to a halt with the target magazine positioned at the delivery point over delivery door 204.

There are numerous alternative ways of setting the duty cycle of the Geneva drive motor. The method used in the preferred embodiment is the DC_Intr_SVC program illustrated in FIG. 10L. The DC_Intr_SVC program is an interrupt which occurs at intervals of 1 msec. Initially the program sets the next interrupt in step 1102. The microprocessor then determines whether it is time to switch the motor on or off (step 1104). If not, the microprocessor exits the program. If it is time to switch the motor on or off, the microprocessor proceeds to step 1108. Here it is determined whether the "on" part of a duty cycle has just been completed. If so, the microprocessor asks whether the duty cycle is 100% (step 1110), an affirmative answer to which indicates that the motor should remain on. If the answer to step 1110 is no, the microprocessor turns the carousel motor off and prepares to count a specified number of interrupts until the motor should be turned on again (step 1112).

If the answer to step 1108 is no, meaning that the motor is to be turned off, the microprocessor proceeds to step 1114 where it turns the motor off and prepares to count a number of interrupts equivalent to the on time of the motor.

Figure 12A:
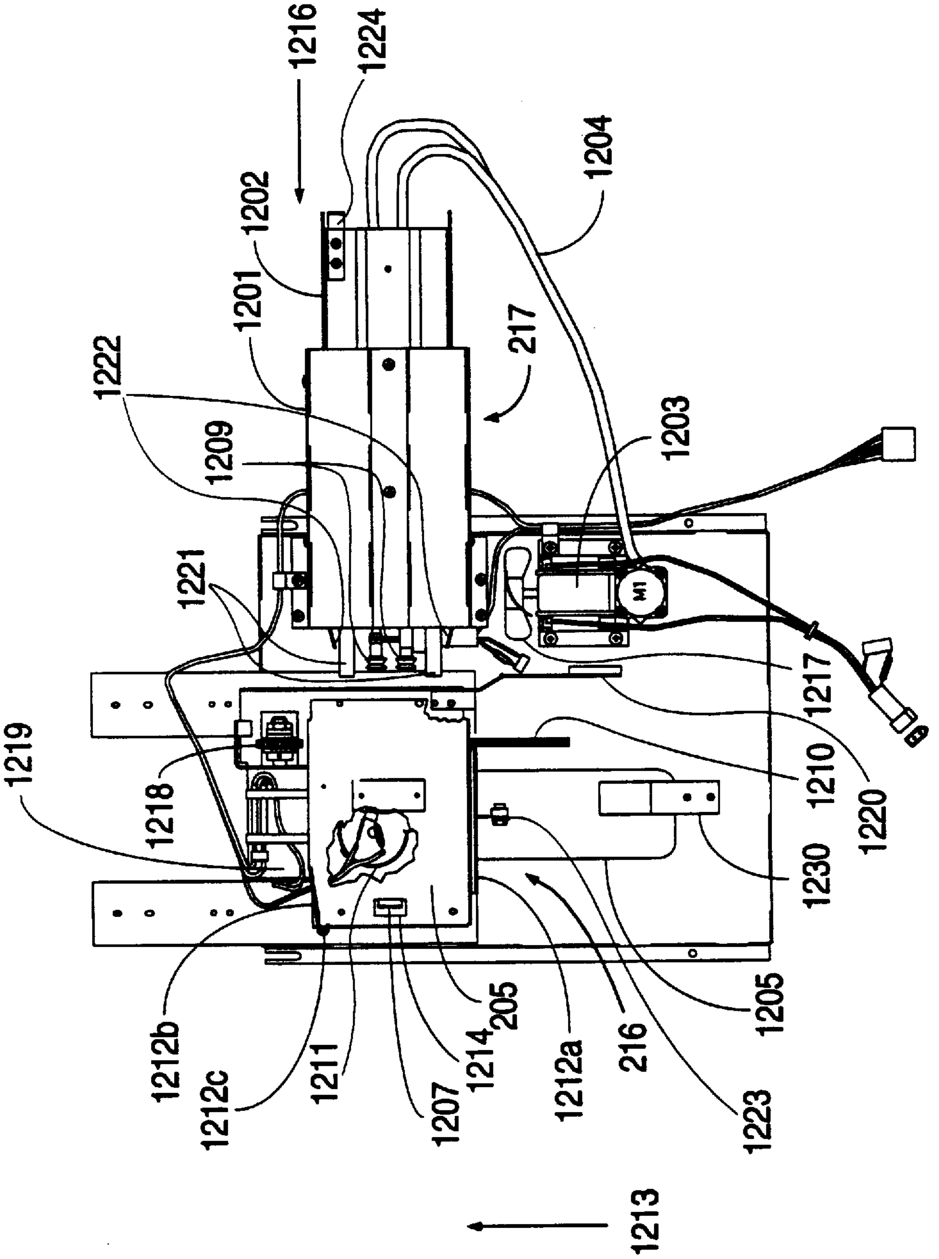
FIG. 12A is a plan view of a delivery tray and transfer mechanisms of the vending machine of FIG. 1.

FIG. 12A is a plan view of delivery tray 205 and transfer mechanism 216 and sleeve/de-sleeve mechanism 217. Delivery tray 205 includes rails 1212*a* and 1212*b* formed on opposite sides of delivery tray 205 and extending above delivery tray 205 in a direction perpendicular to the plane of FIG. 12A. Rails 1212*a* and 1212*b* help keep the packaged food product from slipping off of delivery tray 205. Rail 1212*a* is attached by a spring hinge 1233 (FIGS. 12E and 12G) in the upright position shown in FIG. 12A, so that the packaged food product can be released from delivery tray 205, as explained in more detail below.

Figure 12B:
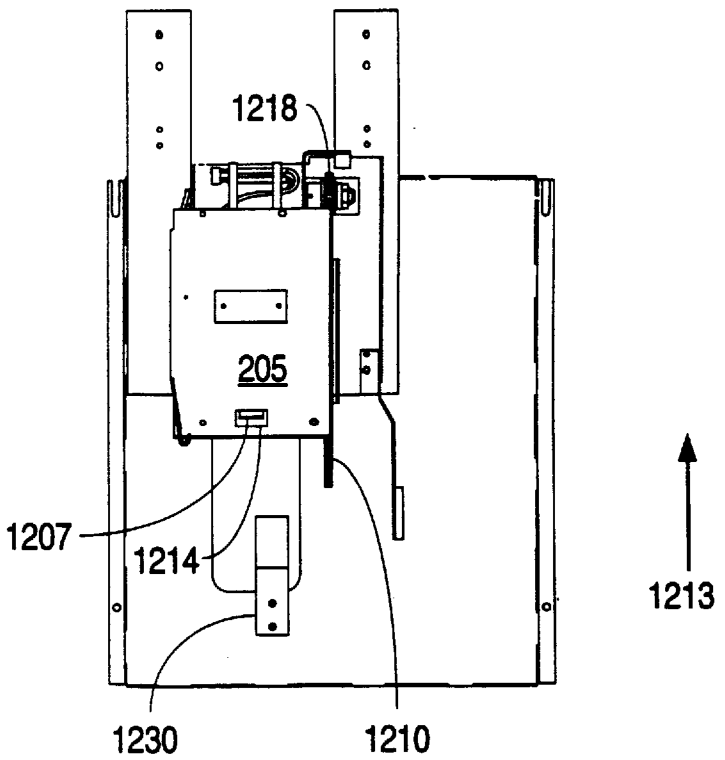
FIGS. 12B and 12C are a plan view and simplified side view, respectively, of the delivery tray and associated transfer mechanism of FIG. 12A when the delivery tray is in a first position for accepting a packaged food product from an inventory magazine.
Figure 12C:
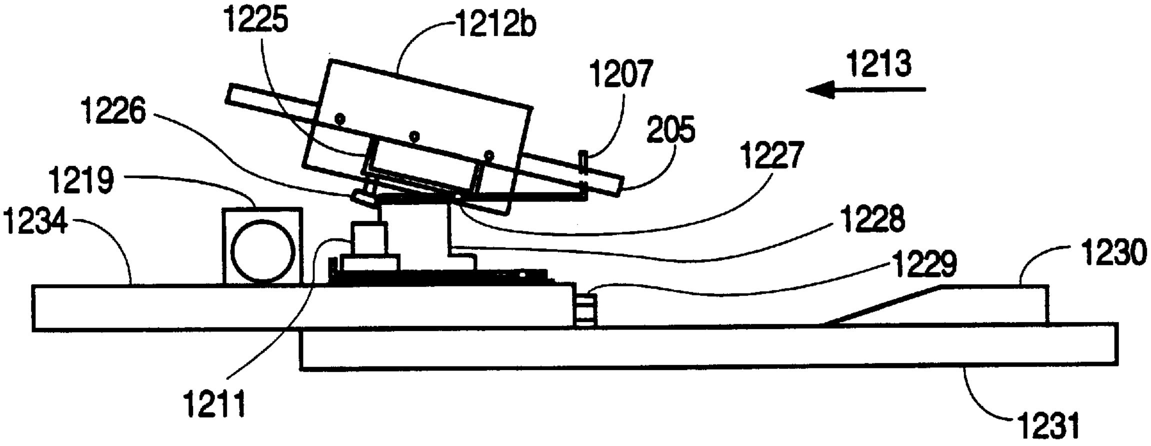

FIGS. 12B and 12C are a plan view and simplified side view, respectively, of delivery tray 205 and associated transfer mechanism 216 when delivery tray 205 is in a first position for accepting a packaged food product from an inventory magazine 202. In the first position, delivery tray 205 is tilted so that the edge of delivery tray 205 nearest delivery chute 103 (FIG. 1) is lower than the opposite edge of delivery tray 205. In one embodiment, delivery tray 205 is tilted so that delivery tray 205 makes an angle of 21° with a horizontal plane. Larger angles are desirable if compatible with vertical height constraints on tilting delivery tray 205. Delivery tray 205 is tilted in this manner to accommodate the orientation of the packaged food product as the packaged food product drops from refrigeration compartment 213 on to delivery tray 205. Food delivery door 204 opens in the direction of arrow 1213, i.e., away from delivery chute 103. As food delivery door 204 opens, the end of the packaged food product nearest delivery chute 103 begins to fall through the opening created by the opening food delivery door 204, thereby resulting in tilting of the packaged food product. When food delivery door 204 fully opens, the packaged food product falls on to delivery tray 205 in approximately the same orientation as that of delivery tray 205 when in the first position.

Delivery tray 205 is formed with a rectangular hole 1214 under which a stop 1207 is positioned. As shown in FIGS. 12B and 12C, when delivery tray 205 is tilted down in the first position, stop 1207 extends through hole 1214. Consequently, stop 1207 prevents the packaged food product from sliding off of the tilted delivery tray 205.

Delivery tray 205 is attached to a bracket 1225 which is, in turn, attached by a hinge 1227 to a support block 1228. A shaft 1250 on which tray 205 is mounted extends vertically through support block 1228. A tilt roller 1226 extends from bracket 1225. As explained in more detail below, interaction of tilt roller 1226 with bracket 1225 causes delivery tray 205 to move from the tilted position shown in FIG. 12C to a level position shown in FIG. 12E when delivery tray 205 is rotated.

After the packaged food product is on delivery tray 205, delivery tray translation motor 1219 moves delivery tray 205 a short distance in the direction of arrow 1213, then back to the position at which the packaged food product dropped on to delivery tray 205. This is done to ensure the packaged food product drops entirely out of food delivery door 204 on to delivery tray 205.

Figure 12D:
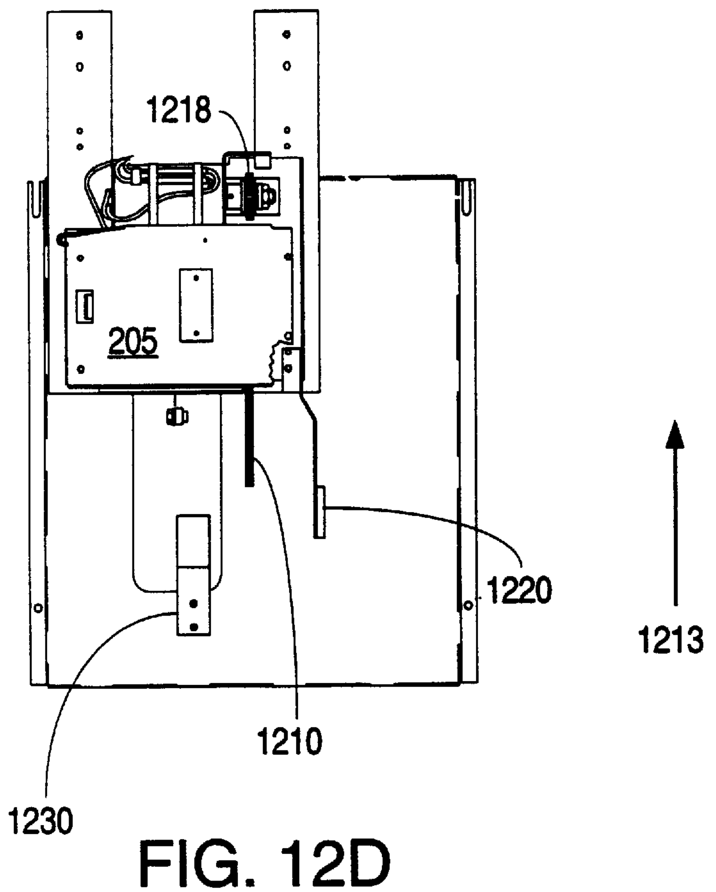
FIGS. 12D and 12E are a plan view and simplified side view, respectively, of the delivery tray and associated transfer mechanism of FIG. 12A when the delivery tray is in a second position for transferring a packaged food product into and out of the oven of FIG. 3.
Figure 12E:
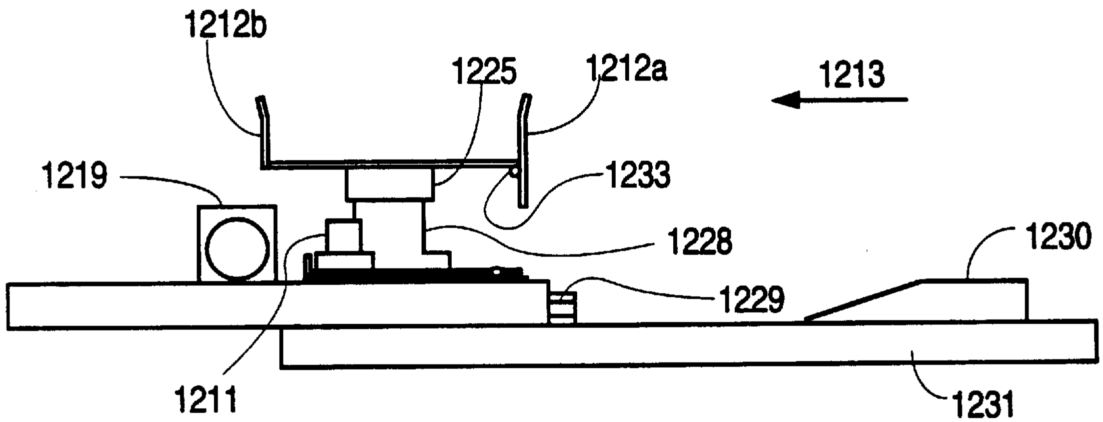

FIGS. 12D and 12E are a plan view and simplified side view, respectively, of delivery tray 205 and associated transfer mechanism 216 when delivery tray 205 is in a second position for transferring a packaged food product into and out of oven 210 (FIG. 2). Control board 208 activates a delivery tray rotation motor 1211 that drives a set of gears **1237*a* and 1237*b* (visible in FIG. 12G) to rotate delivery tray 205 to the second position. Gear 1237*a* is attached to the shaft on which delivery tray 205 is mounted; gear 1237*b* is driven by delivery tray rotation motor 1211. As delivery tray 205 rotates, delivery tray 205 is tilted back so that delivery tray 205 becomes approximately level. Control board 208 de-activates the delivery tray rotation motor 1211 after a pre-set time interval. The time interval is selected to be sufficiently long to ensure that delivery tray 205 continues rotating until delivery tray 205 hits a mechanical stop that, combined with a slip clutch on delivery tray rotation motor 1211, stops delivery tray 205 in the second position for loading the packaged food product from delivery tray 205 into oven 210**. In this embodiment, the second position is oriented approximately 90° from the first position.

Figure 12F:
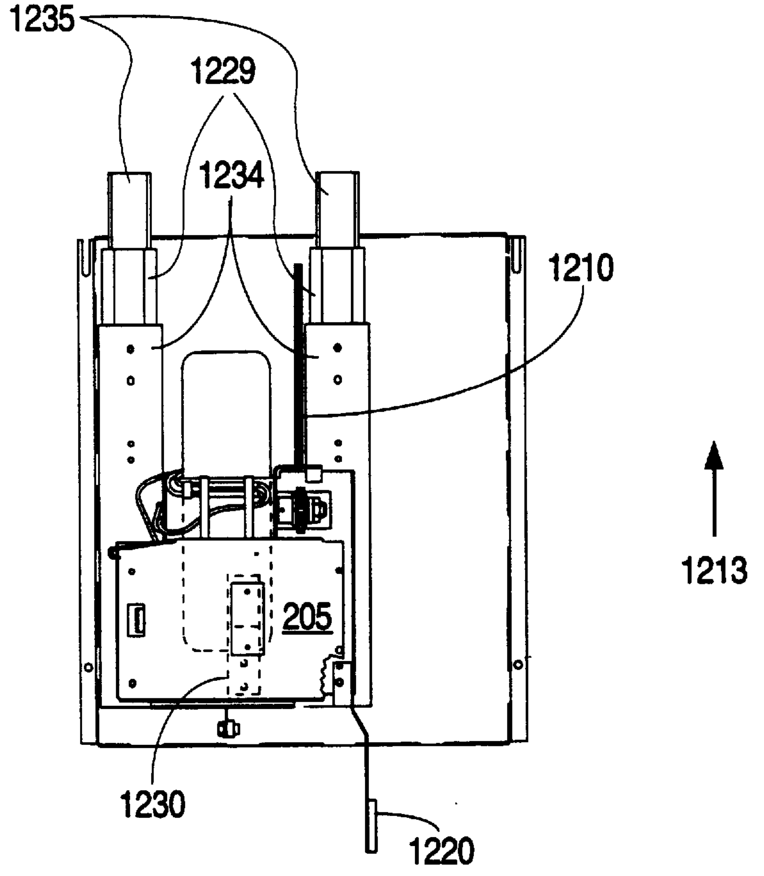
FIGS. 12F and 12G are a plan view and simplified side view, respectively, of the delivery tray and associated transfer mechanism of FIG. 12A when the delivery tray is in a third position for discharging a packaged food product from the delivery tray into a delivery chute.
Figure 12G:
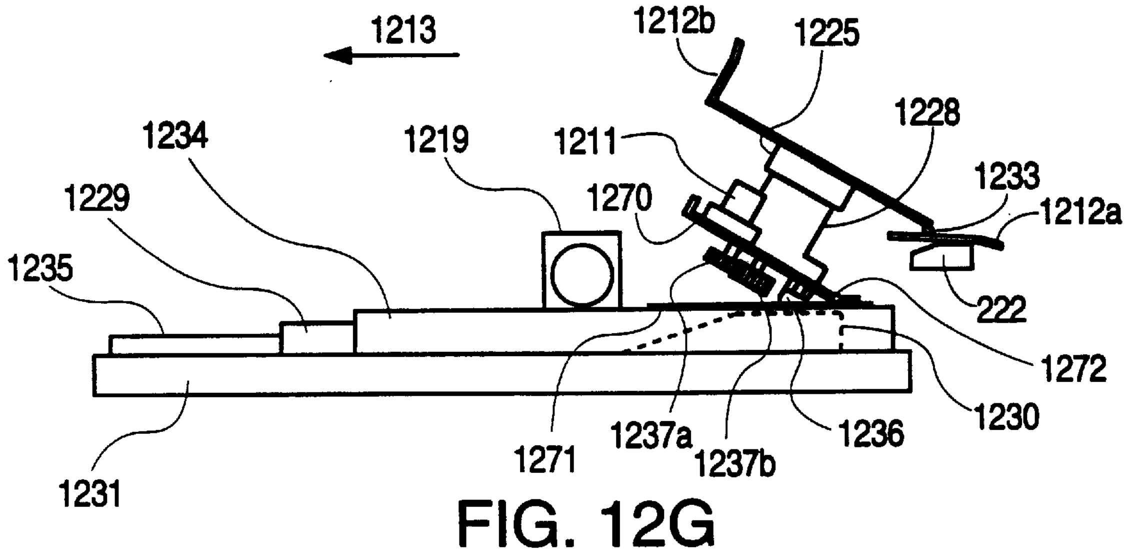
Figure 12H:
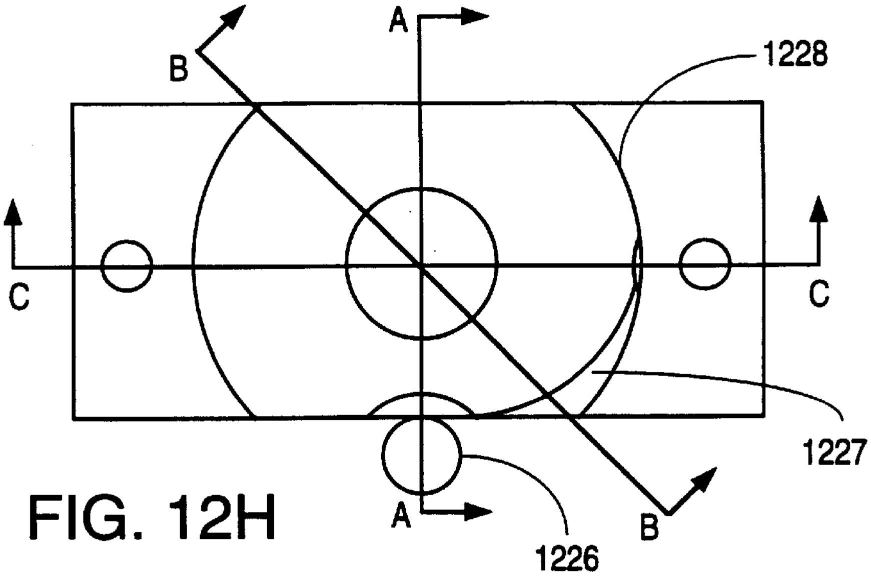
FIG. 12H is a simplified top cross-sectional view of the shaft upon which the delivery tray is mounted and which rotates the delivery tray, illustrating interaction between a tilt knob and the shaft when the delivery tray is in the second position of FIGS. 12D and 12E.
Figure 12I:
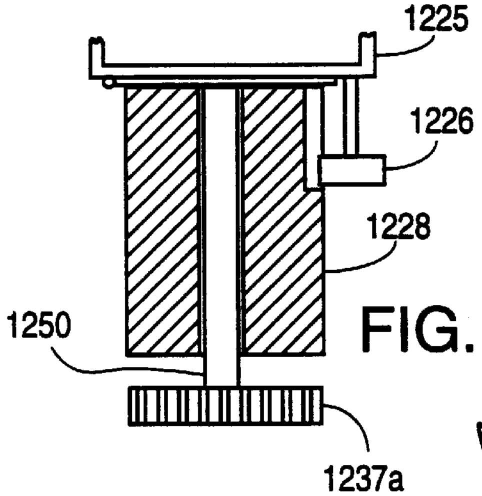
FIG. 12I is a side cross-sectional view of the shaft of FIG. 12H when the delivery tray is in the second position of FIGS. 12D and 12E.
Figure 12J:
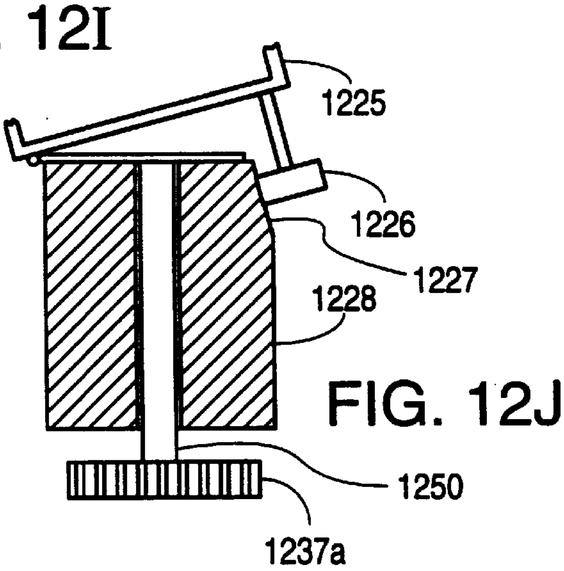
FIG. 12J is a side cross-sectional view of the shaft of FIG. 12H when the delivery tray is in a position intermediate between the first and second positions.
Figure 12K:
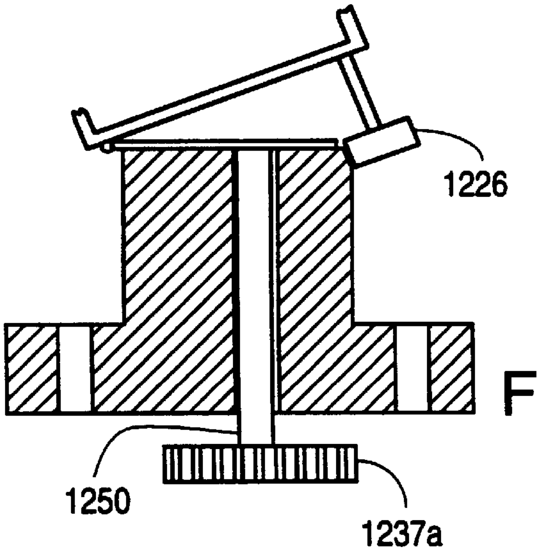
FIG. 12K is a side cross-sectional view of the shaft of FIG. 12H when the delivery tray is in the first position of FIGS. 12B and 12C.

FIGS. 12H through 12K illustrate the mechanism for tilting delivery tray 205 as a result of rotation of delivery tray 205. FIG. 12H is a simplified top view of support block 1228 upon which delivery tray 205 is mounted, illustrating interaction between tilt roller 1226 and support block 1228 when delivery tray 205 is in the second (level) position of FIGS. 12D and 12E. FIG. 12I is a side cross-sectional view, taken along section line A—A of FIG. 12H, when delivery tray 205 is in the second (level) position of FIGS. 12D and 12E. As shaft 1250 begins to rotate, tilt roller 1226 begins to move along a cam surface 1227 of support block 1228, tilting so that delivery tray 205 also tilts. FIG. 12J is a side cross-sectional view, taken along section line B—B of FIG. 12H, when delivery tray 205 is in a position intermediate between the first and second positions. Finally, when shaft 1250 rotates so that delivery tray 205 is in the first (tilted) position, contact between tilt roller 1226 and cam surface 1227 causes delivery tray 205 to reach a maximum tilt. FIG. 12K is a side cross-sectional view, taken along section line C—C of FIG. 12H when delivery tray 205 is in the first position of FIGS. 12B and 12C. When delivery tray 205 is rotated back to the second (level) position (FIGS. 12D and 12E), interaction between tilt roller 1226 and cam surface 1227 of support block 1228 causes delivery tray to level out once more.

When delivery tray 205 is in the second (level) position, control board 208 activates the oven door motor not shown that opens oven door 301. An oven door monitor switch, the operation of which is described in more detail below, indicates whether oven door 301 is fully open. If the oven door monitor switch is not activated within a specified time after control board 208 begins opening oven door 301, then operation of vending machine 100 ceases. Otherwise, when the oven door monitor switch indicates that oven door 301 is fully open, control board 208 deactivates the oven door motor.

Control board 208 then activates a package sleeve/de-sleeve motor 315 to drive sleeve/de-sleeve mechanism 217 that pushes the food tray out of the package sleeve, through oven door 301 and into oven 210. As seen in FIG. 12A, the sleeve/de-sleeve mechanism 217 includes a stationary guide rail 1201, a ram 1202, suction cups 1209 and a vacuum pump 1203.

Figure 12L:
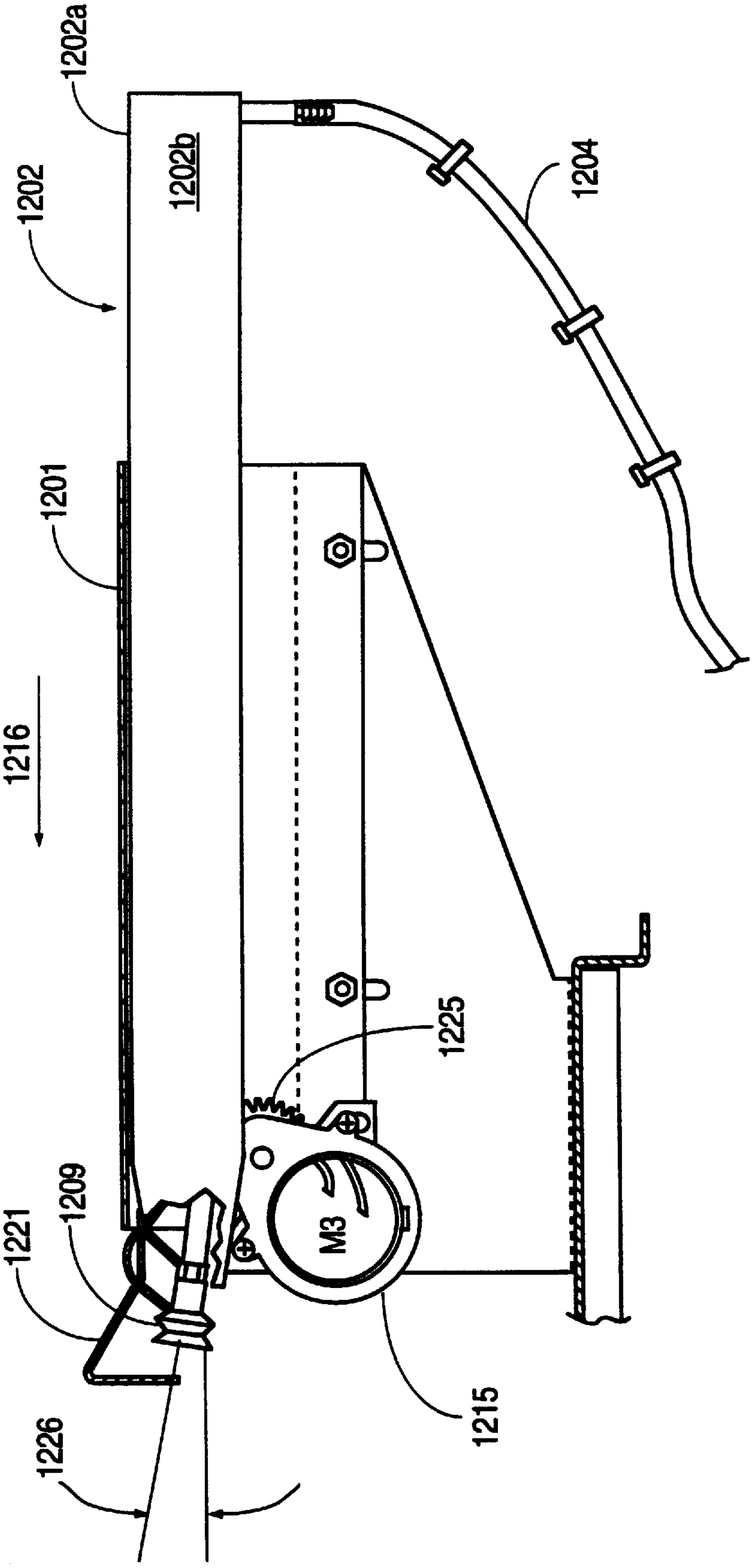
FIG. 12L is a side cross-sectional view of the sleeve/de-sleeve mechanism of the vending machine of FIG. 1.

FIG. 12L is a side cross-sectional view of sleeve/de-sleeve mechanism 217 of vending machine 100. Viewed in a direction parallel to arrow 1216, ram 1202 has an inverted U-shaped cross-section. A rack (not shown) is attached to wall **1202*a* of ram 1202 behind wall 1202*b* of ram 1202. Package sleeve/de-sleeve motor 1215 drives pinion 1225 which moves the rack, thereby moving ram 1216 in the direction of arrow 1216 through stationary guide rail 1201, i.e., toward oven 210. Suction cups 1209 contact the food tray within the package sleeve and push the food tray out of delivery tray 205 and into oven 210. Suction cups 1209 are oriented at an angle 1226 with respect to a horizontal plane so that suction cups 1209 make flush contact with side 902*a* of food tray 902 (FIG. 9A). A hook 1212*c* formed at an end of rail 1212*b* catches an edge of the package sleeve and holds the package sleeve in position on delivery tray 205. During this de-sleeving operation, vacuum pump 1203** is not activated.

Control board 208 de-activates sleeve/de-sleeve motor 1215 after a pre-set time interval. The time interval is specified so that sleeve/de-sleeve motor 1215 will be activated for a sufficient length of time to ensure that the packaged food product is fully inserted into oven 210. A mechanical stop 1224 (FIG. 12A), combined with a slip clutch on sleeve/de-sleeve motor 1215, stops the packaged food product at a specified position within oven 210.

Control board 208 re-activates package sleeve/de-sleeve motor 1215 to withdraw ram 1202 from oven 210. Control board 208 de-activates package sleeve/de-sleeve motor 1215 after a pre-set time interval that is specified to ensure that ram 1202 is withdrawn to allow oven door 301 to close.

Control board 208 then re-activates the oven door motor to begin closing oven door 301. The oven door monitor switch indicates whether oven door 301 is fully closed. If the oven door monitor switch is not activated within a specified time after control board 208 begins closing oven door 301, then operation of vending machine 100 ceases. Otherwise, when the oven door monitor switch indicates that oven door 301 is fully closed, control board 208 de-activates the oven door motor.

Figure 13A:
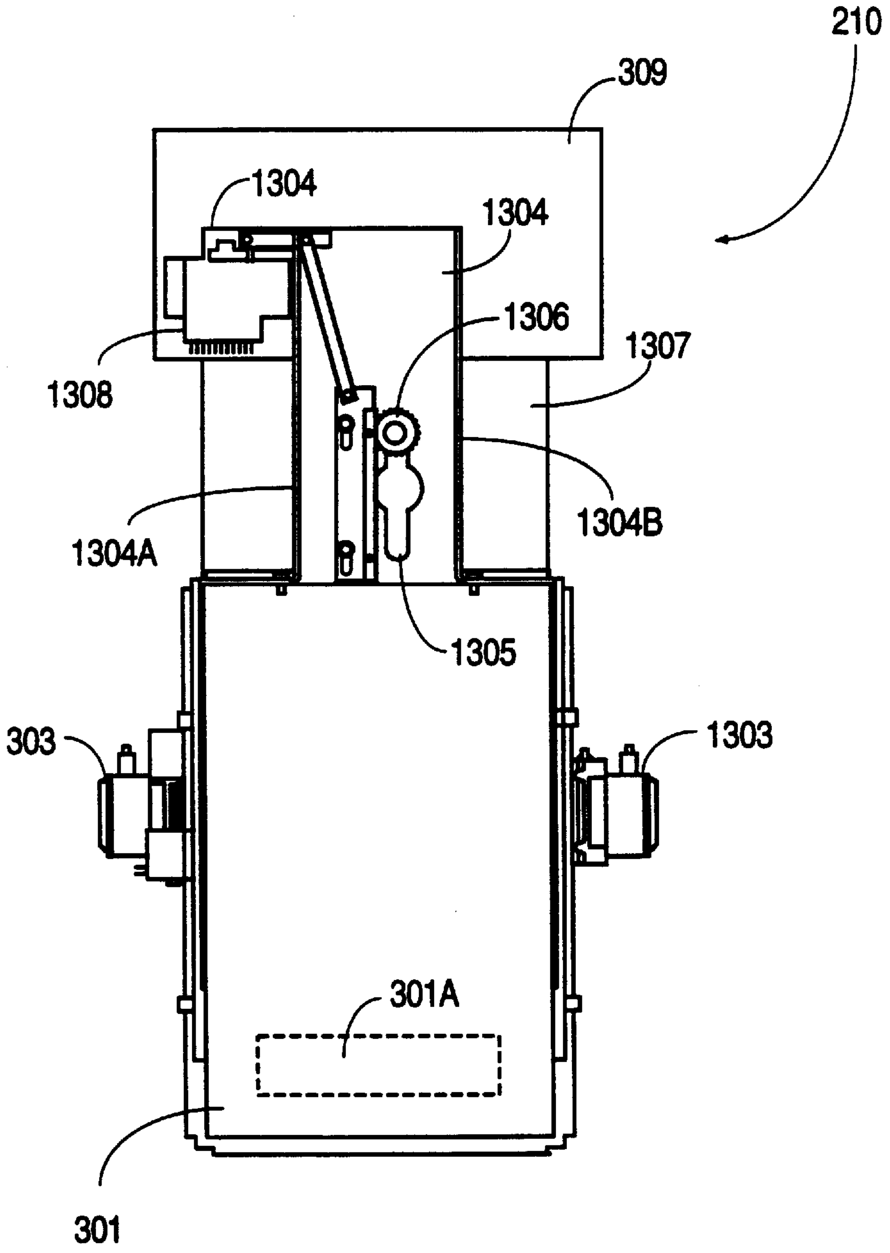
FIG. 13A is a front view of the oven of FIG. 3.

FIG. 13A is a front view of oven 210. Magnetrons 303 and 1303 are mounted to opposite sides of oven 210. Oven door 301 is shown, with the position of oven aperture 301A indicated in dashed lines.

A plate 1304 is bolted to the top edge of oven door 301. Plate 1304 has edge flanges 1304A and 1304B to give it structural rigidity and has a slot 1305 formed in it through which a gear 1306 extends. Gear 1306 is driven by the oven door motor (not visible in FIG. 13A) which is mounted within a housing 1307. An interlock switch 1308 is mounted to the front of oven power supply box 309.

Figure 13B:
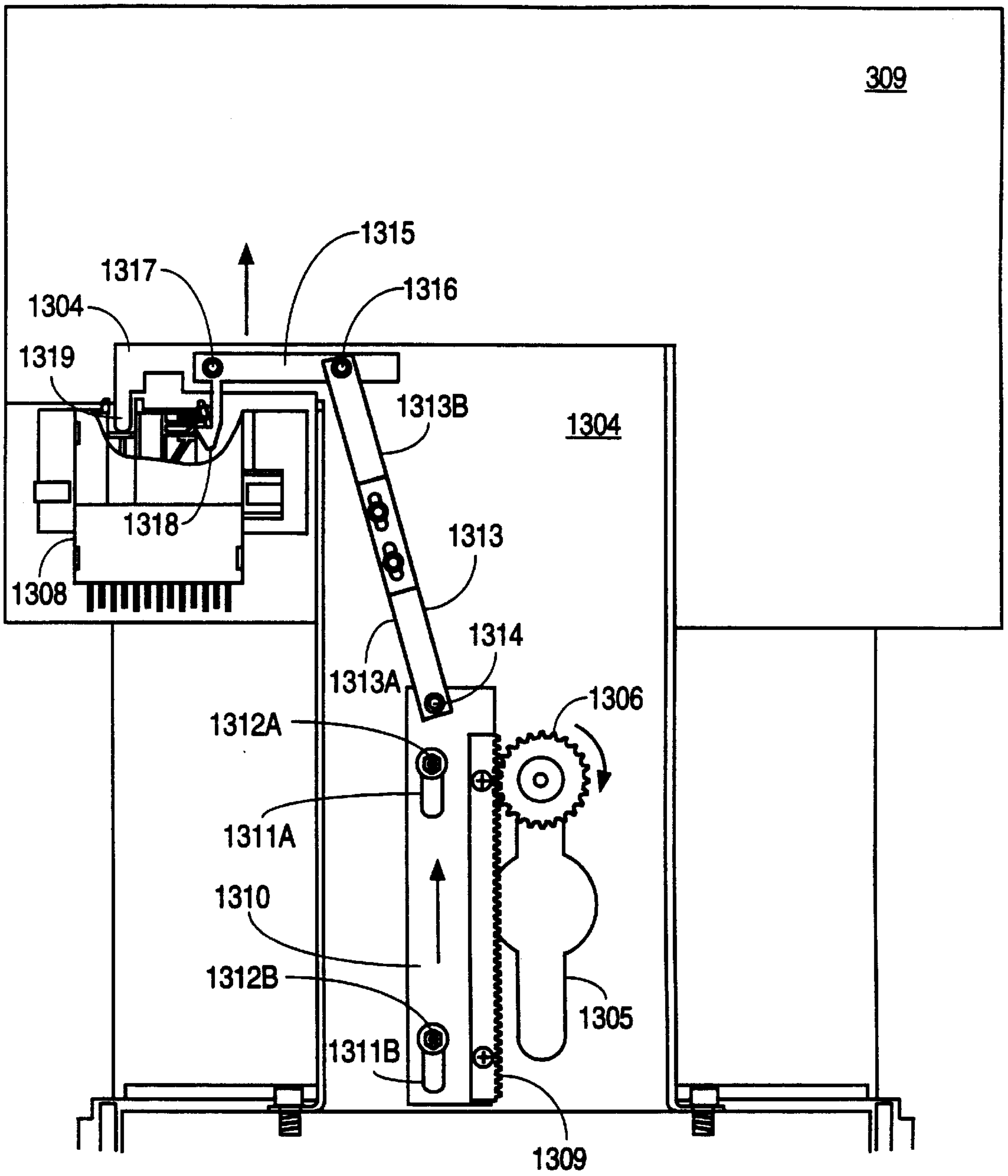
FIG. 13B is a detailed view of a portion of FIG. 13A, illustrating the mechanism for opening the oven door of the oven of FIG. 3.

FIG. 13B shows details of the mechanisms associated with plate 1304. A rack 1309 is bolted to a rack plate 1310 and meshes with gear 1306. Slots 1311A and 1311B are formed in rack plate 1310. Bolts 1312A and 1312B are threaded into plate 1304. Bolts 1312A and 1312B extend through slots 1311A and 1311B, respectively, and thereby hold rack plate 1310 against plate 1304, allowing rack plate 1310 to move in a vertical direction only. Thus, if gear 1306 rotates clockwise (as shown by the arrow), rack plate 1310 is lifted until bolts 1312A and 1312B engage the lower limits of slots 1311A and 1311B, respectively, at which point plate 1304 begins to lift.

A link 1313 is pivotally attached to rack plate 1310 at a pin 1314 and to a link 1315 at a pin 1316. Link 1315 is rotatably attached to plate 1304 at a pin 1317. A hook 1318 is formed at an end of link 1315. A finger 1319 is formed integrally with plate 1304. Link 1313 includes sections 1313A and 1313B which are joined by a slot arrangement which allows the overall length of link 1313 to be adjusted.

In this embodiment, interlock switch 1308 is a model P/N 600-00081 manufactured by Tricon Industries, Incorporated, of Downers Grove, Ill. Hook 1318 and finger 1319 engage primary, secondary and monitor switching mechanisms within interlock switch 1308. The primary and secondary switching mechanisms are connected serially in the power supply circuit for magnitrons 303 and 1303 (FIG. 13A) so that the magnitrons cannot be powered unless the oven door is in a closed position.

The operation of this mechanism will now be described. When oven 301 is to be opened, gear 1306 rotates clockwise, thereby lifting rack plate 1310. Until bolts 1312A and 1312B engage the lower edges of slots 1311A and 1311B (a travel of about 1 inch), rack plate 1310 lifts link 1313 and causes link 1315 to rotate counter-clockwise about pin 1317. Since hook 1318 is formed integrally with link 1315, hook 1318 likewise rotates counter-clockwise, and the primary and secondary switching mechanisms within interlock switch 1308 are opened. Note that this action occurs before plate 1304 has begun to rise. When bolts 1312A and 1312B engage the lower limits of slots 1311A and 1311B, plate 1304 begins to be lifted. Since finger 1319 is formed integrally with plate 1304, finger 1319 is withdrawn from interlock switch 1308, thereby closing the monitor switching mechanism within interlock switch 1308. In this embodiment, the monitor switching mechanism closes after finger 1319 has been withdrawn 0.075 inches. The monitor switch within the interlock switch 1308 is closed, causing a short across the power line to each of magnetrons 303 and 1303.

Figure 13C:
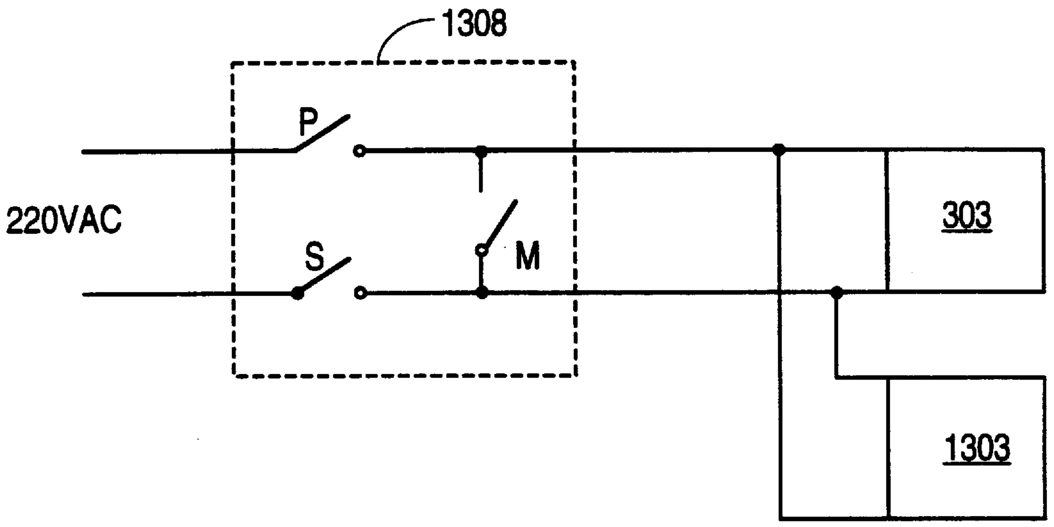
FIG. 13C is a simplified circuit diagram of the circuitry relating to the interlock switch of the oven of FIG. 3.

FIG. 13C illustrates a simplified circuit diagram of the circuitry relating to interlock switch 1308, with P representing the primary switching mechanism, S representing the secondary switching mechanism and M representing the monitor switch. The details and specifications of interlock switch 1308 are set forth in the specification for Part Nos. 600-00081, 600-00082 and 600-00083, available from Tricon Industries, Inc., 2325 Wisconsin Avenue, Downers Grove, Ill. and are incorporated herein by reference.

The above-described process is reversed when oven door 301 is closed. Importantly, oven door 301 is fully closed before either the primary or secondary interlock switches are closed, thus ensuring the oven 210 cannot operate while oven door 301 is open.

To begin the cooking process, control board 208 activates oven 210 according to a cooking cycle entered by the user at control board 208. After the food product is cooked, control board 208 de-activates oven 210 and opens oven door 301 in the same manner as described above. Control board 208 turns on vacuum pump 1203 (see FIG. 12A). Vacuum pump 1203 supplies suction through pump lines 1204 to suction cups 1209. In one embodiment, the vacuum pressure is 4 psi. Control board 208 activates package sleeve/de-sleeve motor 1215 so that ram 1202 is moved through oven aperture 301*a* into oven 210, as described above. As above, package sleeve/de-sleeve motor 1215 is de-activated by control board 208 after a pre-set time, the position of ram 1202 being established by the mechanical stop together with sleeve/de-sleeve motor slip clutch. Suction cups 1209 contact the packaged food product, flush with the side 902*a* of food tray 902 due to the angle 1226 at which suction cups 1209 are oriented, the vacuum drawn through suction cups 1209 engaging food tray 902 to suction cups 1209.

Control board 208 then re-activates package sleeve/de-sleeve motor 1215 to withdraw ram 1202 from oven 210, as described above. As ram 1202 is withdrawn, the packaged food product is pulled into the package sleeve, which remains on delivery tray 205 during cooking of the food product. Reinsertion of the packaged food product into the sleeve, which, since the sleeve remains outside oven 210 during cooking, is relatively cool to the touch, enables a user to pick up the packaged food product after discharge from vending machine 100 without being burned. Control board 208 de-activates the sleeve/de-sleeve motor 1215 after a pre-set time interval that is specified to ensure that ram 1202 is withdrawn to its initial position on guide rail 1201. Stops 1221 stop the food product tray when it has been pulled all the way back into the package sleeve. Vacuum pump 1203 is then turned off, so that suction is no longer applied through suction cups 1209.

After the packaged food product is withdrawn from oven 210, control board 208 activates the oven door motor to close oven door 301, as described more fully above.

FIGS. 12F and 12G are a plan view and simplified side view, respectively, of delivery tray 205 and associated transfer mechanism 216 when delivery tray 205 is in a third position for discharging a packaged food product from delivery tray 205 into delivery chute 103. Control board 208 activates delivery tray translation motor 1219 for a pre-set period of time to move delivery tray 205 toward delivery chute 103 Motor 1219 drives a pinion 1218 which meshes with a stationary rack 1210, as shown in FIG. 12D. Delivery tray 205 is attached to a rail 1234 which telescopes with movable rail 1229 and fixed rail 1235 to allow delivery tray 205 to move toward delivery chute 103. As delivery tray 205 moves toward delivery chute 103, delivery tray 205 moves over a ramp 1230. Support block 1228 is mounted on a plate 1270 which is connected to a base plate 1271 by a hinge 1272. A knob 1236 formed on the bottom of the support structure for delivery tray 205 contacts ramp 1230 causing delivery tray 205 to tilt over. Further, the bottom portion of rail 1212*a* strikes stop 222 attached to front service door 101, causing rail 1212*a* to fall down and allow the packaged food product to leave delivery tray 205 and enter delivery chute 103.

Generally, swinging door 219 (FIG. 2) is locked. When a packaged food product is discharged from delivery chute 103, a roller 1220 pushes swinging door 219 open. Delivery tray translation motor 1219 and solenoid 223, which normally latches swinging door 219 shut, are connected electrically in parallel. When motor 1219 is powered, solenoid 223 is energized, freeing swinging door 219 to be pushed open by roller 1220.

After a specified time delay, e.g., 3 seconds, control board 208 activates delivery tray translation motor 1219 to retract delivery tray 205. Delivery tray translation motor 1219 is de-activated after a pre-set time interval that is sufficiently long to ensure that delivery tray 205 is withdrawn to a position for accepting another packaged food product from one of inventory magazines 202. A mechanical stop, together with the slip clutch of delivery tray translation motor 1219, positions delivery tray 205 at the desired position.

Empty magazine indicator 606 (FIGS. 6A through 6E) continuously detects whether a packaged food product is present in each inventory magazine 202, as discussed in more detail above. If no packaged food product is present, then control board 208 causes a display bar to be displayed in the appropriate price display 110, rather than the price for that food product, and control board 208 does not process any request for cooking of that food product.

Control board 208 activates delivery tray rotation motor 1211 to rotate delivery tray 205 back to the first position, i.e., in position for accepting a new packaged food product. Delivery tray rotation motor 1211 is activated for a specified period of time that is sufficiently long to ensure that delivery tray 205 is rotated back into the first position. A mechanical stop, together with the slip clutch of the delivery tray rotation motor 1211, positions delivery tray 205 at the first position.

Various embodiments of the invention have been described. The descriptions are intended to be illustrative, not limitative. Thus, it will be apparent to one skilled in the art that certain modifications may be made to the invention as described without departing from the scope of the claims set out below.

We claim:

1. A vending machine comprising an inventory carousel mounted rotatably on a vertical axis, the inventory carousel including a plurality of inventory magazines mounted around the vertical axis, each inventory magazine comprising a product chute and having a product release mechanism for releasing product contained in the inventory magazine, said product release mechanism comprising:

- an inventory magazine release member having first and second cam surfaces, the inventory magazine release member movable between first and second positions;
- a first retention lever rotatably mounted so as to pivot about a first axis, the first retention lever including a first cam follower in contact with the first cam surface, wherein:
  - when the inventory magazine release member is positioned in the first position, contact between the first cam surface and first cam follower causes the first retention lever to be retracted from the product chute; and
  - when the inventory magazine release member is positioned in the second position, contact between the first cam surface and first cam follower causes the first retention lever to be extended into the product chute; and
- a second retention lever rotatably mounted so as to pivot about a second axis, the second retention lever including a second cam follower in contact with the second cam surface, wherein:
  - when the inventory magazine release member is positioned in the first position, contact between the second cam surface and second cam follower causes the second retention lever to be extended into the product chute; and
- when the inventory magazine release member is positioned in the second position, contact between the second cam surface and second cam follower causes the second retention lever to be retracted from the product chute.

2. The vending machine of claim 1 wherein the inventory carousel is mounted above a floor, a food delivery aperture being located in the floor at a position such that the inventory magazines pass over the food delivery aperture as the inventory carousel is rotated about the vertical axis.

3. The vending machine of claim 2 wherein the inventory carousel is mounted within a refrigeration compartment.

4. The vending machine of claim 2 wherein each of the inventory magazines is capable of holding a stack of packaged food products.

5. A combination including the vending machine of claim 4 and a stack of packaged food products held in each of the inventory magazines, wherein each of the packaged food products comprises a product tray.

6. The vending machine of claim 2 further comprising a delivery tray for receiving a packaged food product after the packaged food product falls from one of the inventory magazines through the food delivery aperture.

7. A combination including the vending machine of claim 6 and a packaged food product positioned in said delivery tray, wherein the packaged food product comprises a product tray positioned within a sleeve and wherein the vending machine further comprises a sleeve/de-sleeve mechanism for removing the product tray from the sleeve and replacing the product within the sleeve.

8. The combination of claim 7 wherein the vending machine further comprises an oven.

9. The combination of claim 8 wherein the sleeve/de-sleeve mechanism removes the product tray from the sleeve and moves the product tray into the oven.

10. The combination of claim 9 wherein the sleeve/de-sleeve mechanism removes the product tray from the oven and replaces the product tray within the sleeve.

11. The combination of claim 8 wherein the oven comprises an oven door and a microwave generator and a door interlock mechanism for preventing the microwave generator from operating when the oven door is not fully closed.

12. The combination of claim 11 wherein the vending machine further comprises a transfer mechanism for moving the packaged food product from a position below the delivery aperture to a position adjacent the sleeve/de-sleeve mechanism.

13. The combination of claim 12 wherein the transfer mechanism moves the packaged food product from the position adjacent the sleeve/de-sleeve mechanism to a delivery chute.

14. The vending machine of claim 1 further comprising:

a motor for rotating the inventory carousel; and a modified Geneva drive mechanism for transferring rotational movement from the motor to the inventory carousel, the drive mechanism comprising a cloverleaf-shaped output turret and a rotatable input member having a pair of drive pins, the drive pins being positioned on opposite sides of a leaf of the cloverleaf-shaped output turret when an inventory magazine in the inventory carousel is located above a product delivery aperture.

15. The vending machine of claim 14 wherein the pins are positioned on opposite sides of a first leaf when the output turret is in a first index position and on opposite sides of a second leaf adjacent to the first leaf when the output turret is in a second index position, the input disk rotating 180 degrees in driving the output turret between the first and second index positions.

16. The vending machine of claim 1 further comprising a magazine actuator for actuating any one of said product release mechanisms.

17. The vending machine of claim 1 wherein said inventory magazine release member comprises a pair of inventory magazine release rods which are positioned adjacent opposite sides of said product chute.

18. The vending machine of claim 17 wherein said inventory magazine release rods are joined by a cross bar at a top of said inventory magazine.

19. The vending machine of claim 17 wherein said inventory magazine release rods are mechanically coupled to an inventory magazine lift for alternately raising and lowering said inventory magazine release rods.

20. The vending machine of claim 19 wherein said inventory magazine lift comprises a crank.

21. A vending machine comprising a sleeve/de-sleeve mechanism for removing a food tray from a sleeve enclosing the food tray, the sleeve/de-sleeve mechanism comprising:

a support for the food tray and sleeve;

a ram positioned adjacent an open end of the sleeve;

an actuator for moving the ram such that a leading end of the ram projects into the sleeve, thereby pushing the food tray from the sleeve; and a hook for engaging an edge of the sleeve and thereby retaining the sleeve on the support when the food tray is pushed from the sleeve.

22. The vending machine of claim 21 wherein the actuator includes a motor and a rack and pinion.

23. A vending machine comprising:

a refrigeration compartment including a product delivery door in a floor of the refrigeration compartment;

an inventory carousel rotatably mounted in the refrigeration compartment and including a plurality of inventory magazines;

a plurality of packaged food products stacked in each inventory magazine, each of the packaged food products including a food tray enclosed by a sleeve;

a microwave oven;

a transfer mechanism for moving one of the packaged food products to a first position near a door of the microwave oven and to a second position near a delivery chute;

a ram;

an actuator for moving the ram so as to push a food tray from a sleeve into the oven; and a hook for engaging an edge of the sleeve and thereby restraining the sleeve when the food tray is pushed from the sleeve into the oven.

* * * * *